US012529324B2

(12) United States Patent
Hatta et al.

(10) Patent No.: US 12,529,324 B2
(45) Date of Patent: Jan. 20, 2026

(54) TURBINE STATIC BLADE, FITTING STRUCTURE, AND GAS TURBINE

(71) Applicant: MITSUBISHI HEAVY INDUSTRIES, LTD., Tokyo (JP)

(72) Inventors: Masayoshi Hatta, Tokyo (JP); Kazuki Morimoto, Tokyo (JP); Susumu Wakazono, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/721,415

(22) PCT Filed: Dec. 21, 2022

(86) PCT No.: PCT/JP2022/047053
§ 371 (c)(1),
(2) Date: Jun. 18, 2024

(87) PCT Pub. No.: WO2023/132236
PCT Pub. Date: Jul. 13, 2023

(65) Prior Publication Data
US 2025/0059897 A1 Feb. 20, 2025

(30) Foreign Application Priority Data
Jan. 6, 2022 (JP) ................. 2022-000793

(51) Int. Cl.
*F01D 25/12* (2006.01)
*F01D 5/18* (2006.01)
(Continued)

(52) U.S. Cl.
CPC ............ *F01D 25/12* (2013.01); *F01D 5/18* (2013.01); *F01D 5/187* (2013.01); *F01D 9/041* (2013.01);
(Continued)

(58) Field of Classification Search
CPC . F01D 25/12; F01D 5/18; F01D 5/187; F01D 9/041; F02C 7/18
See application file for complete search history.

(56) References Cited

U.S. PATENT DOCUMENTS 3,965,066 A * 6/1976 Sterman .................. F01D 9/023
415/138
5,470,198 A 11/1995 Harrogate et al.
(Continued)

FOREIGN PATENT DOCUMENTS

DE 10 2019 211 418 2/2021
JP 2002-266603 9/2002
(Continued)

OTHER PUBLICATIONS

International Search Report issued Jan. 31, 2023 in International Application No. PCT/JP2022/047053, with English translation of search report.
(Continued)

*Primary Examiner* — Brian Christopher Delrue
(74) *Attorney, Agent, or Firm* — Wenderoth, Lind & Ponack, L.L.P.

(57) ABSTRACT

Provided is a turbine static blade composed of a blade body and shrouds respectively formed on both ends in the blade height direction of the blade body. The shroud includes: a main member having a heat-resistance coat film section which extends from the axial upstream end to the axial downstream end of a gas passing surface; and a protruding section which protrudes from a side end section on the front edge side of the main member toward the axial upstream side. The protruding section comprises a plurality of cooling paths which are disposed in an annular shape at predetermined intervals in the circumferential direction, and connect an inlet opening which is formed in an inner circumferential surface of the protruding section and an inner surface of the (Continued)

main member, and an outlet opening which is formed in an outer circumferential surface of the protruding section.

15 Claims, 10 Drawing Sheets

(51) Int. Cl.
  *F01D 9/04* (2006.01)
  *F01D 11/00* (2006.01)
  *F02C 7/18* (2006.01)
(52) U.S. Cl.
  CPC .............. *F01D 11/005* (2013.01); *F02C 7/18* (2013.01); *F05D 2220/32* (2013.01); *F05D 2240/12* (2013.01); *F05D 2260/20* (2013.01)

(56) References Cited

U.S. PATENT DOCUMENTS

| | | | | |
|---|---|---|---|---|
| 5,954,477 | A * | 9/1999 | Balsdon | F01D 5/3015 416/220 A |
| 6,082,961 | A | 7/2000 | Anderson et al. | |
| 7,004,721 | B2 * | 2/2006 | Imbourg | F01D 5/187 415/115 |
| 7,360,988 | B2 * | 4/2008 | Lee | F01D 25/243 29/889.22 |
| 7,527,469 | B2 * | 5/2009 | Zborovsky | F01D 9/041 415/110 |
| 9,938,847 | B2 * | 4/2018 | Li | F01D 11/08 |
| 10,598,037 | B2 * | 3/2020 | Jacon | F01D 21/12 |
| 10,724,392 | B2 * | 7/2020 | Taniguchi | F16J 15/4476 |
| 10,738,629 | B2 | 8/2020 | Granberg et al. | |
| 11,834,994 | B2 * | 12/2023 | Matsuo | F16J 15/4476 |
| 2002/0127111 | A1 | 9/2002 | Tomita et al. | |
| 2005/0135920 | A1 * | 6/2005 | Synnott | F01D 25/14 415/115 |
| 2007/0134090 | A1 * | 6/2007 | Heyward | F01D 9/023 415/209.2 |
| 2010/0129199 | A1 | 5/2010 | Davis | |
| 2016/0245093 | A1 * | 8/2016 | Deibel | F01D 9/041 |
| 2017/0268380 | A1 * | 9/2017 | Lehmann | F01D 25/12 |
| 2017/0370241 | A1 * | 12/2017 | Tham | C04B 35/80 |
| 2018/0258776 | A1 * | 9/2018 | Hewitt | C23C 28/321 |
| 2021/0254553 | A1 * | 8/2021 | Karanian | F02C 7/12 |
| 2022/0268172 | A1 * | 8/2022 | Kunte | F01D 11/005 |
| 2022/0268211 | A1 * | 8/2022 | Matsuo | F02C 7/18 |
| 2024/0183277 | A1 * | 6/2024 | Kobayashi | F01D 9/042 |

FOREIGN PATENT DOCUMENTS

| | | | |
|---|---|---|---|
| JP | 2007-154899 | 6/2007 | |
| JP | 2007-514888 | 6/2007 | |
| JP | 2021-32082 | 3/2021 | |
| WO | WO-2021033564 A1 * | 2/2021 | ............. F01D 11/00 |

OTHER PUBLICATIONS

International Preliminary Report on Patentability issued Jul. 18, 2024 in International Application No. PCT/JP2022/047053, with English translation.

* cited by examiner

TURBINE STATIC BLADE, FITTING STRUCTURE, AND GAS TURBINE

TECHNICAL FIELD

The present disclosure relates to a turbine static blade provided with a cooling passage, a fitting structure, and a gas turbine using the turbine static blade and the fitting structure.

The present application claims the right of priority based on Japanese Patent Application No. 2022-000793 filed with the Japan Patent Office on Jan. 6, 2022, the content of which is incorporated herein by reference.

BACKGROUND ART

A gas turbine generates a high-temperature combustion gas by mixing air compressed by a compressor with fuel and burning the mixture in a combustor. The combustion gas rotates a rotor, in which turbine static blades and turbine rotor blades are alternately disposed, and to which the turbine rotor blades are fixed, to generate electric power. A seal member is provided between the combustor and the turbine static blade in order to seal a gap between the combustor and the turbine static blade. Further, at a connecting portion between the seal member provided between the combustor and the turbine static blade, and the turbine static blade, in order to prevent cooling air in a casing from leaking into a combustion gas flow path through the gap between the seal member and the turbine static blade, the gap between the seal member and the turbine static blade is sealed by disposing a fixed seal at the seal member and bringing the fixed seal and the turbine static blade into contact with each other. The turbine static blade, the combustor, and the seal member are exposed to the high-temperature combustion gas, thereby being susceptible to thermal damage. Therefore, these components are provided with cooling air passages to supply cooling air to cool the components and to prevent thermal damage. An example of such a cooling structure is disclosed in PTL 1.

CITATION LIST

Patent Literature

[PTL 1] Japanese Unexamined Patent Application Publication No. 2021-32082

SUMMARY OF INVENTION

Technical Problem

However, in the case of a gas turbine that has been operated for a long period of time, a contact surface of the fixed seal with the turbine static blade is worn out due to vibration or the like, so that the gap between the turbine static blade and the seal member in a fitting portion between the turbine static blade and the seal member expands, the combustion gas is drawn into the gap, and thus there is a possibility that the high-temperature combustion gas causes thermal damage to the components of the turbine static blade.

An object of the present disclosure is to provide a turbine static blade having a cooling structure capable of suppressing thermal damage to components in a fitting portion when a combustion gas is drawn into a gap of the fitting portion between the turbine static blade and a seal member, a fitting structure, and a gas turbine provided with the turbine static blade and the fitting structure.

Solution to Problem

According to an aspect of the present disclosure, there is provided a turbine static blade including: a blade body; and shrouds formed at both ends in a blade height direction of the blade body, in which the shroud includes a main member having a heat-resistant coating film portion which extends from an axial upstream end to an axial downstream end of a gas path surface, and a protrusion portion which protrudes from a side end portion on a leading edge side of the main member toward an axial upstream side, and the protrusion portion includes a plurality of cooling passages which are annularly disposed at predetermined intervals in a circumferential direction, and each of which connects an inlet opening formed on an inner peripheral surface of the protrusion portion or on an inner surface of the main member, and an outlet opening formed on an outer peripheral surface of the protrusion portion.

Advantageous Effects of Invention

According to the turbine static blade according to the present disclosure, even in a case where a combustion gas is drawn into the gap of the fitting portion between the turbine static blade and the seal member, since cooling of the protrusion portion of the turbine static blade is enhanced and thermal damage to the protrusion portion is suppressed, the reliability of the gas turbine is improved.

DESCRIPTION OF EMBODIMENTS

Hereinafter, embodiments of the present disclosure will be described based on the drawings.

<<Configuration of Gas Turbine>>

Figure 1:
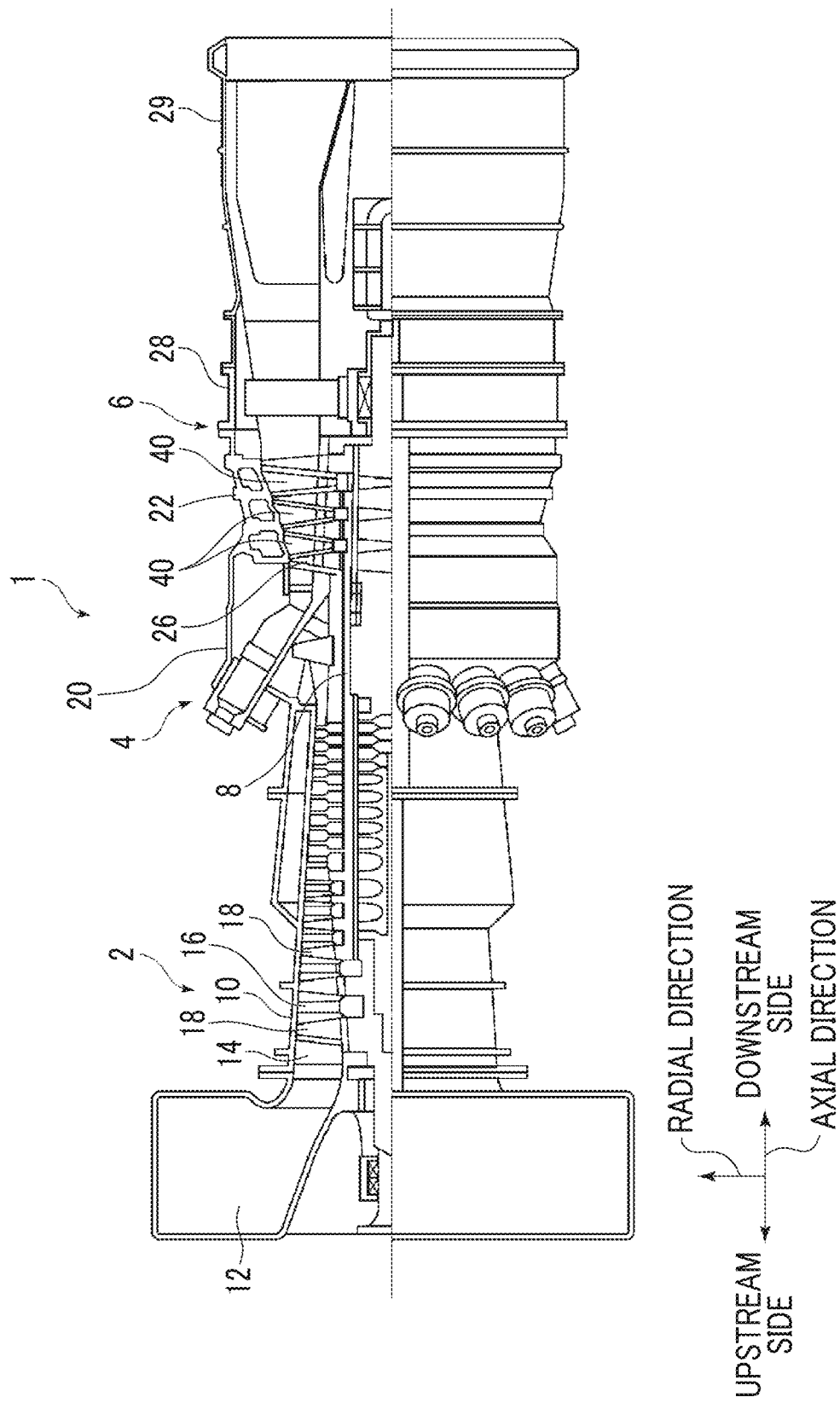
FIG. 1 is a schematic configuration diagram of a gas turbine of a first embodiment according to the present disclosure.

An aspect of a gas turbine according to the present disclosure will be described with reference to FIG. 1. FIG. 1 is a schematic configuration diagram showing a gas turbine 1 of the present aspect.

As shown in FIG. 1, the gas turbine 1 according to the present aspect includes a compressor 2 for generating compressed air A, a combustor 4 that generates a combustion gas G by using the compressed air A and fuel FL, and a turbine 6 that is rotationally driven by the combustion gas G. In the case of the gas turbine 1 for power generation, a generator (not shown) is connected to the turbine 6, and power generation is performed by the rotational energy of the turbine 6.

The compressor 2 includes a compressor casing 10, an intake chamber 12 that is provided on an inlet side of the compressor casing 10 in order to take in air, a rotor 8 that is provided to penetrate both the compressor casing 10 and a turbine casing 22 to be described later, and various blades that are disposed within the compressor casing 10. The various blades include an inlet guide blade 14 provided on an intake chamber 12 side, a plurality of compressor static blades 16 fixed to the compressor casing 10, and a plurality of compressor rotor blades 18 implanted in the rotor 8 to be arranged alternately with respect to the compressor static blades 16 in an axial direction. In such a compressor 2, air taken in from the intake chamber 12 is compressed while passing through the plurality of compressor static blades 16 and the plurality of compressor rotor blades 18, so that the compressed air A is generated. The compressed air A is discharged from the compressor 2 into a space 21 in a casing 20 on an axial downstream side, and is supplied to the combustor 4 disposed within the casing 20.

As shown in FIG. 1, a plurality of combustors 4 are disposed annularly around the rotor 8 within the casing 20. The combustor 4 is supplied with the fuel FL and the compressed air A generated by the compressor 2, and burns the fuel FL, thereby generating the high-temperature combustion gas G that is a working fluid of the turbine 6. The generated combustion gas G is sent from the combustor 4 to the subsequent turbine 6 on an axial downstream side.

The turbine 6 includes a turbine casing 22 and various turbine blades disposed within the turbine casing 22. The turbine blades include a plurality of turbine static blades 40 fixed to a turbine casing 22 side, and a plurality of turbine rotor blades 26 implanted in the rotor 8 to be arranged alternately with respect to the turbine static blades 40 in the axial direction.

In the turbine 6, the rotor 8 extends in the axial direction, and the combustion gas G discharged from the turbine casing 22 is discharged to an exhaust casing 28 on a downstream side in the axial direction. In FIG. 1, a left side in the drawing is an axial upstream side, and a right side in the drawing is an axial downstream side. Further, in the following description, in a case where simply a radial direction is written, the radial direction represents a direction orthogonal to the rotor 8. Further, in a case where a circumferential direction is written, the circumferential direction represents a rotation direction of the rotor 8.

The turbine rotor blade 26 is configured to generate a rotational driving force from the high-temperature and high-pressure combustion gas G flowing in the turbine casing 22, together with the turbine static blade 40. This rotational driving force is transmitted to the rotor 8 to drive a generator (not shown) connected to the rotor 8.

An exhaust chamber 29 is connected to the axial downstream side of the turbine casing 22 through the exhaust casing 28. The combustion gas G after driving the turbine 6 is discharged to the outside through the exhaust casing 28 and the exhaust chamber 29.

<<Structure Around Combustor>>

Figure 2:
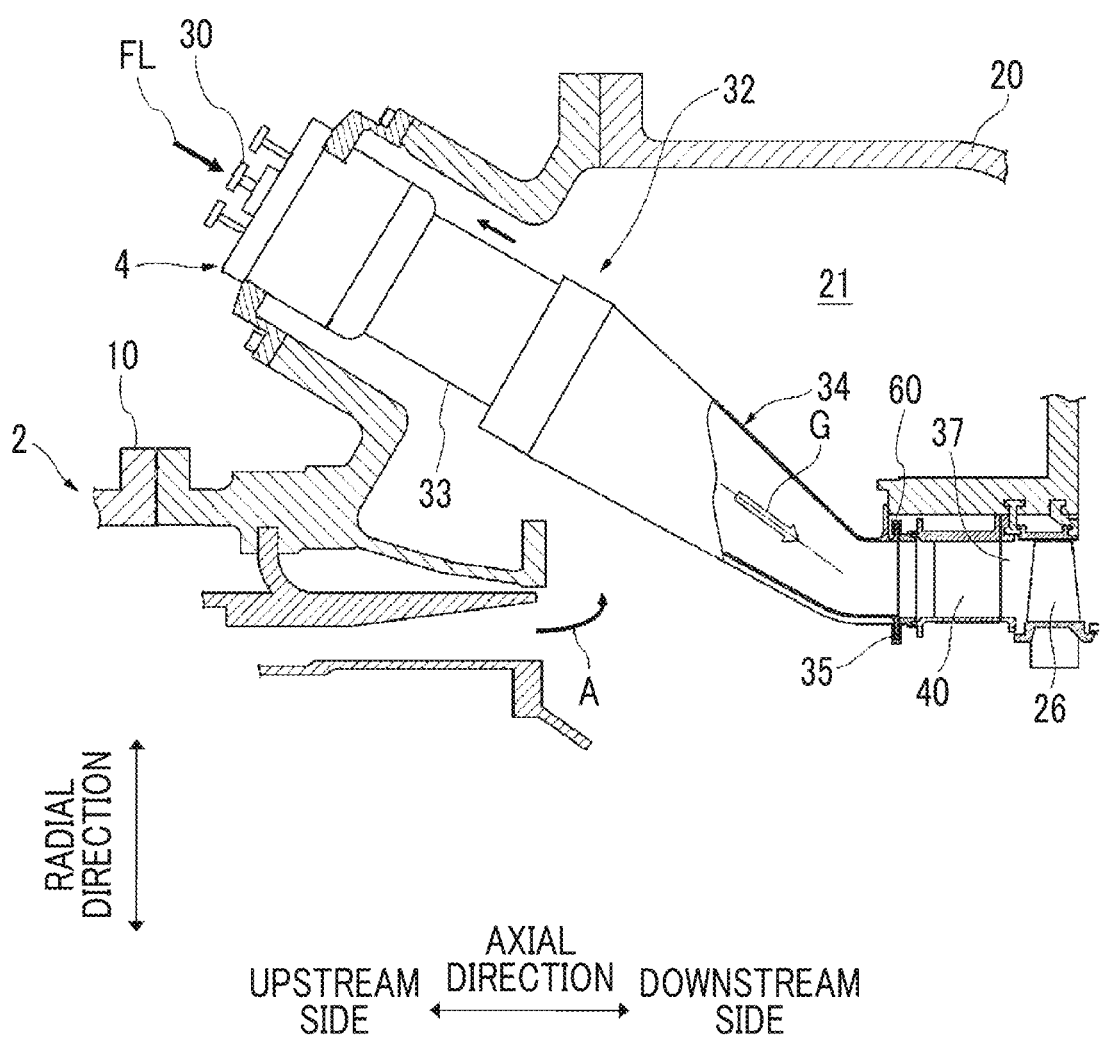
FIG. 2 is a diagram showing a configuration around a combustor of the first embodiment according to the present disclosure.
Figure 3:
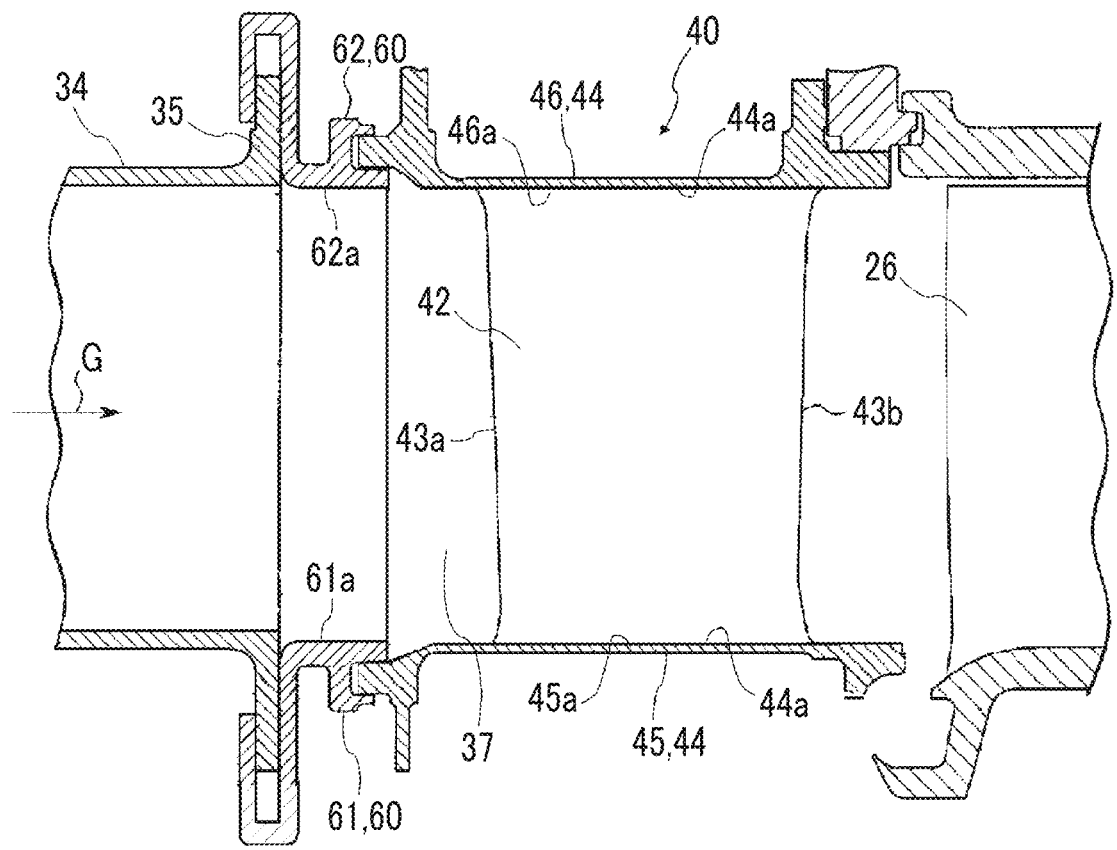
FIG. 3 is a diagram showing a configuration around a turbine static blade and a seal member of the first embodiment according to the present disclosure.

FIG. 2 shows a schematic structure around the combustor 4 of the gas turbine 1 in an aspect. FIG. 3 shows a structure around the turbine static blade 40 and a seal member 60. As shown in FIG. 2, the plurality of combustors 4 are disposed annularly around the rotor 8 within the casing 20. The combustor 4 includes a plurality of fuel nozzles 30 that supply the fuel FL to the combustor 4, and a combustion cylinder 32 that mixes the fuel FL and the compressed air A and burns the mixture. The combustion cylinder 32 includes an inner cylinder 33 that burns the fuel FL and the compressed air A to generate the combustion gas G, and a transition piece 34 that supplies the combustion gas G to the turbine 6. A flange 35 that is connected to the turbine static blade 40 through the seal member 60 is disposed at an axial downstream end of the transition piece 34. The flange 35 is formed over an entire outer periphery of the transition piece 34 that forms a combustion gas flow path 37.

As shown in FIG. 3, a predetermined gap is provided between the flange 35 of the transition piece 34 and the turbine static blade 40 that is connected to the flange 35 on the axial downstream side, in order to absorb a difference in thermal elongation in the axial direction, and the detachable seal member 60 is inserted therein. A plurality of seal members 60 are disposed annularly around the rotor 8.

In the seal member 60, an inner seal member 61 disposed on a radial inner side and an outer seal member 62 disposed on a radial outer side with respect to the combustion gas flow path 37 are combined to configure a set of seal members 60. One set of seal members 60 is disposed on the axial downstream side corresponding to one set of combustors 4. However, one set of seal members 60 may be disposed corresponding to a plurality of combustors 4.

The axial upstream side of the seal member 60 is connected to the transition piece 34 forming the combustion gas flow path 37 through the flange 35, and the axial downstream side of the seal member 60 is detachably fitted to a shroud 44 of the turbine static blade 40. A radial outer surface 61a of the inner seal member 61 and a radial inner surface 62a of the outer seal member 62 are in contact with the combustion gas flow path 37.

First Embodiment

Figure 4:
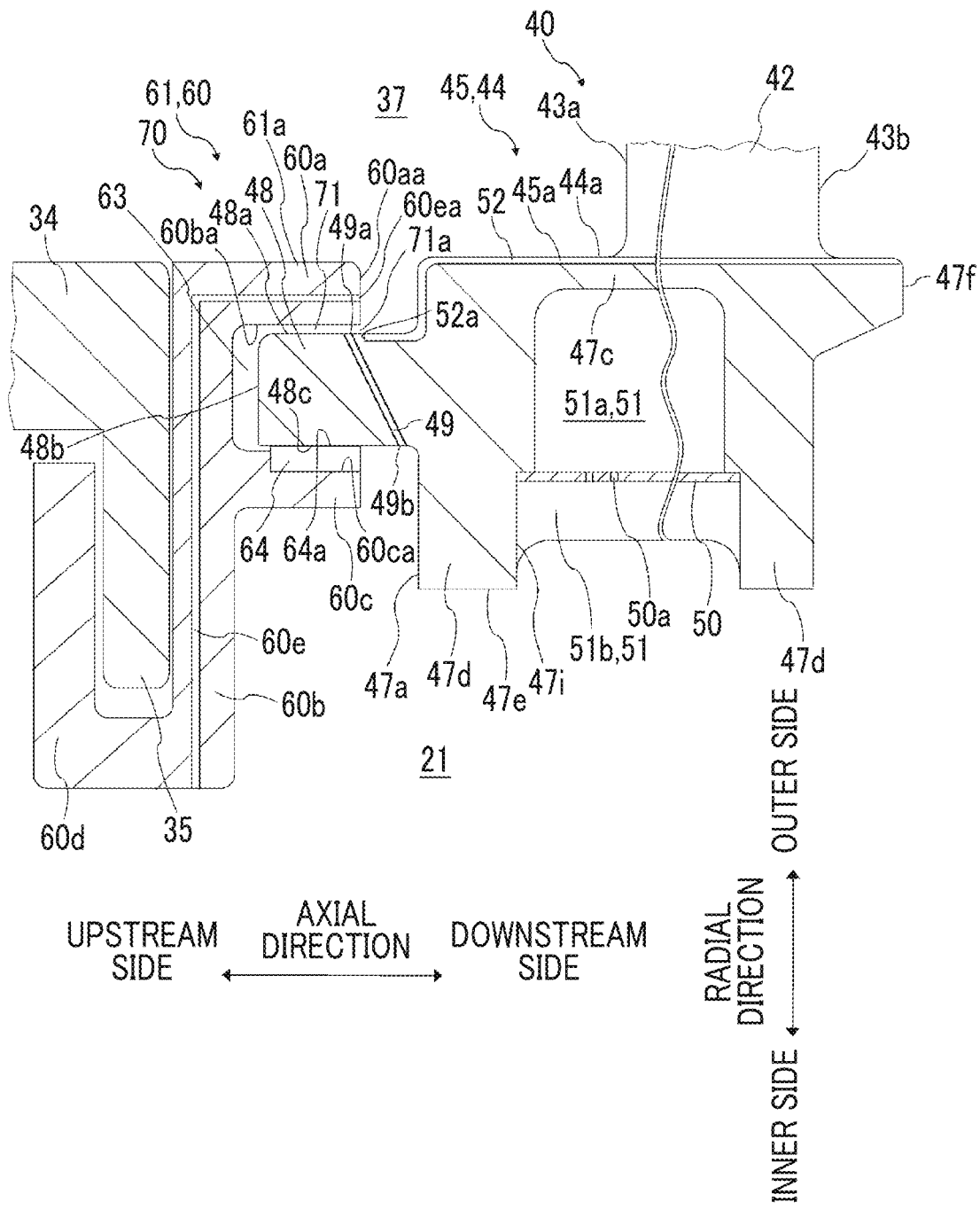
FIG. 4 is a structural diagram of a combination of the turbine static blade and the seal member in the first embodiment according to the present disclosure.
Figure 5:
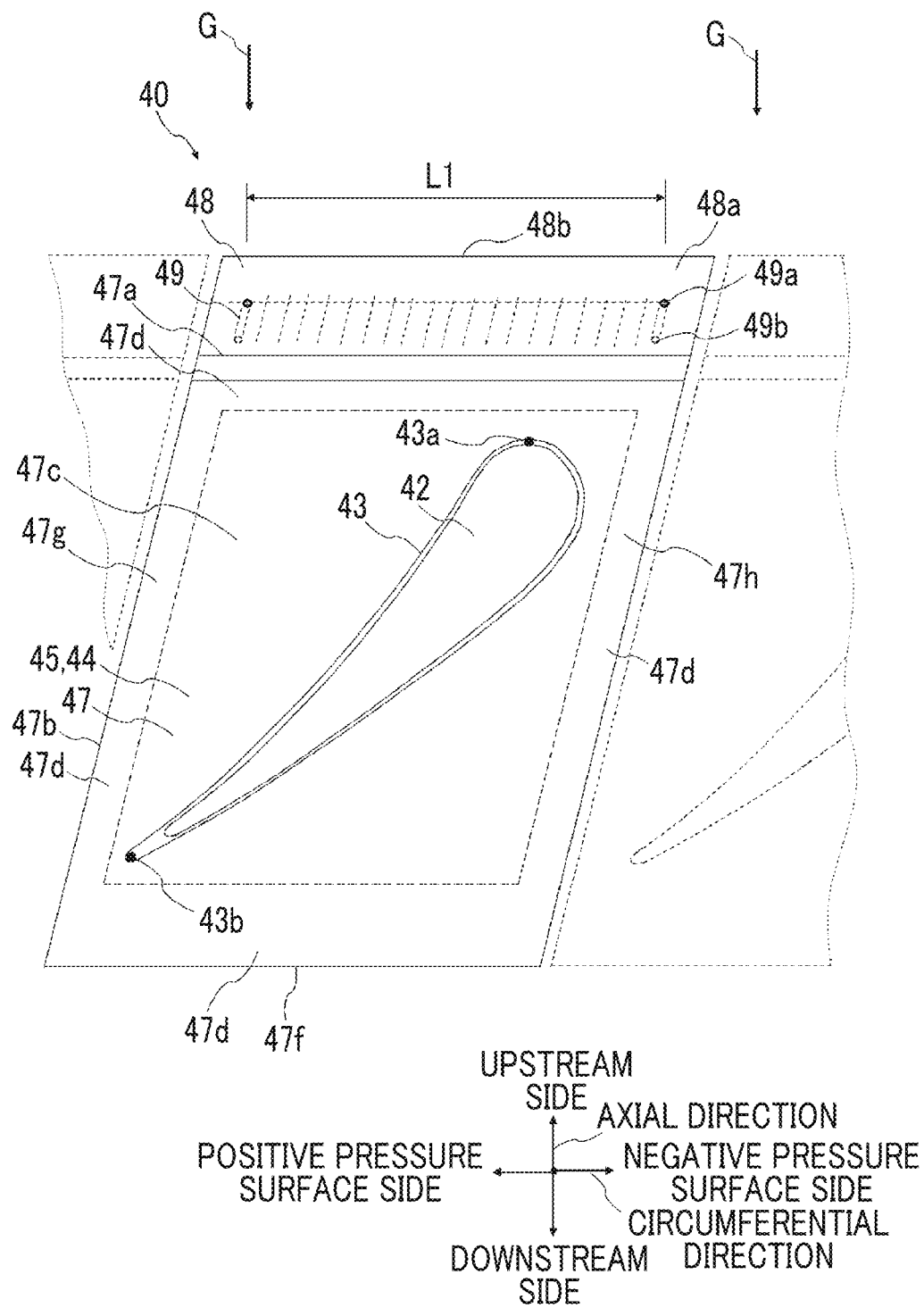
FIG. 5 is a planar disposition diagram of the turbine static blade provided with a cooling air passage of the first embodiment according to the present disclosure.

FIG. 4 shows an example in which the turbine static blade 40 and the inner seal member 61 are combined as a combined structure of the turbine static blade 40 and the seal member 60 according to the first embodiment. Also in the case of the combined structure of the turbine static blade 40 and the outer seal member 62, the same structure is applied. FIG. 5 shows an example of a plan sectional view of the turbine static blade 40 as viewed in the blade height direction.

The turbine static blade 40 shown in FIGS. 3 to 5 includes a blade body 42 extending in the blade height direction, and the shrouds 44 that are connected to the blade body 42 at both ends in the blade height direction of the blade body 42. The shroud 44 is composed of an inner shroud 45 formed at an inner end in the blade height direction with respect to the blade body 42, and an outer shroud 46 formed at an outer end in the blade height direction. An outer surface 45a of the inner shroud 45 and an outer surface 46a of the outer shroud 46 form gas path surfaces 44a and are in contact with the combustion gas flow path 37.

As shown in FIGS. 4 and 5, the shroud 44 (the inner shroud 45) of the turbine static blade 40 includes a main member 47 configuring a main body of the shroud 44, a protrusion portion 48 that protrudes from a side end portion 47a on the axial upstream side of the main member 47 toward the axial upstream side, extends annularly in the circumferential direction, and is formed in a plate shape, and a collision plate 50 having a plurality of through-holes 50a, the details of which will be described later. The main member 47 is composed of a bottom portion 47c that forms a bottom surface of the inner shroud 45, and an outer wall portion 47d that is formed at an outer edge 47b, which is an outer periphery of the bottom portion 47c, and that protrudes in a direction opposite to the combustion gas flow path 37 in the blade height direction with respect to the gas path surface 44a. The main member 47 and the protrusion portion 48 are integrally formed. A cavity 51 that is surrounded by the outer wall portion 47d and recessed from an outer wall end portion 47e in a direction approaching the gas path surface 44a in the blade height direction is formed inside the main member 47. The collision plate 50 having the plurality of through-holes 50a is disposed in the cavity 51, and the cavity 51 is divided, by the collision plate 50, into an inner cavity 51a formed on a side close to the gas path surface 44a in the blade height direction, and an outer cavity 51b formed adjacent to the inner cavity 51a in a direction away from the gas path surface 44a in the blade height direction. The inner cavity 51a and the outer cavity 51b communicate with each other through the through-holes 50a of the collision plate 50.

A cooling passage 49, the details of which will be described later, is formed in the protrusion portion 48. The protrusion portion 48 protrudes toward a leading edge 43a side of the shroud 44 in the axial direction, and extends in the circumferential direction in a range between positions of the flanges 35 of the transition piece 34 formed at both ends in the circumferential direction. An outer surface of the bottom portion 47c, which is in contact with the combustion gas G, forms the gas path surface 44a.

A heat-resistant coating film portion 52 is formed on the gas path surface 44a of the shroud 44 in order to suppress thermal damage from the high-temperature combustion gas G flowing through the combustion gas flow path 37. The heat-resistant coating film portion 52 is formed to cover substantially the entire surface of the gas path surface 44a of the shroud 44, and is formed in an entire range from a position of a coating film portion upstream end 52a on the axial upstream side of the main member 47 and the protrusion portion 48 that are in contact with the combustion gas G to a downstream end portion 47f of the main member 47 on the axial downstream side, and from a positive pressure surface-side end portion 47g to a negative pressure surface-side end portion 47h in the circumferential direction.

<<Seal Member>>

The seal member 60 (the inner seal member 61) shown in FIG. 4 is disposed between the transition piece 34 of the combustor 4 and the turbine static blade 40 in the axial direction. The seal member 60 is composed of a plate-shaped first main body portion 60a that extends from the axial upstream side toward the axial downstream side and that is formed annularly in the circumferential direction, a plate-shaped second main body portion 60b that is connected to an axial upstream end of the first main body portion 60a, extends in an inward direction in the blade height direction, and is formed in a fan shape in the circumferential direction, a plate-shaped third main body portion 60c that protrudes in an axial downstream direction from an intermediate position of the second main body portion 60b in the blade height direction and that is formed annularly in the circumferential direction, and a connecting portion 60d that is connected to the second main body portion 60b at an inner end portion thereof in the inward direction in the blade height direction, extends in an axial upstream direction, and extends in an outward direction in the blade height direction from the axial upstream end. The first main body portion 60a, the second main body portion 60b, the third main body portion 60c, and the connecting portion 60d are integrally formed. The flange 35 of the transition piece 34 can be inserted into a gap formed in the blade height direction between the second main body portion 60b and the connecting portion 60d from the outward direction in the blade height direction. Further, a recessed portion 63 recessed toward the axial upstream side from the axial downstream ends of the first main body portion 60a and the third main body portion 60c is formed between the first main body portion 60a and the third main body portion 60c, and the protrusion portion 48 of the turbine static blade 40 can be fitted into the recessed portion 63. The seal member 60 includes a cooling flow path 60e disposed in the first main body portion 60a and the second main body portion 60b in order to avoid thermal damage due to heat input from the combustion gas flow path 37. A plurality of cooling flow paths 60e are arranged at predetermined intervals in the circumferential direction of the first main body portion 60a and the second main body portion 60b. The cooling flow path 60e is formed to extend in the outward direction in the blade height direction in the second main body portion 60b, extend in the axial direction in the first main body portion 60a from a position where the first main body portion 60a and the second main body portion 60b are connected to each other, and is formed to be open to the combustion gas flow path 37. The compressed air A in the space 21 surrounded by the casing 20 is used as the cooling air that is supplied from an inner end in the blade height direction of the second main body portion 60b to the cooling flow path 60e.

Although the above description has been made by using the inner seal member 61 as an example, the outer seal member 62 also has the same structure as the inner seal member 61. However, the inner seal member 61 is the seal member 60 disposed between the transition piece 34 of the combustor 4 and the inner shroud 45 of the turbine static blade 40. On the other hand, the outer seal member 62 is different from the inner seal member 61 in that the outer seal member 62 is disposed between the transition piece 34 of the combustor 4 and the outer shroud 46 of the turbine static blade 40. Therefore, in the case of the outer seal member 62, the outward direction in the blade height direction in the description of the inner seal member 61 described above shall be read as the inward direction in the blade height direction, and the inward direction in the blade height direction shall be read as the outward direction in the blade height direction.

<<Fitting Structure>>

As shown in FIGS. 3 and 4, the protrusion portion 48 of the turbine static blade 40 is inserted into the recessed portion 63 of the seal member 60 from the axial downstream side, so that a fitting structure 70 composed of the seal member 60 and the protrusion portion 48 of the turbine static blade 40 is formed. The fitting structure 70 is configured with a combination of the protrusion portion 48 of the turbine static blade 40 and the first main body portion 60a and the third main body portion 60c of the seal member 60. The fitting structure 70 is a structure in which the protrusion portion 48 and the seal member 60 are fitted to each other with a slight gap maintained in the blade height direction and are detachable from each other in the axial direction.

As shown in FIG. 4, it is desirable that the position of the coating film portion upstream end 52a on the axial upstream side of the heat-resistant coating film portion 52 that is formed on the gas path surface 44a of the shroud 44 coincides with a position of an axial downstream end 60aa of the first main body portion 60a of the seal member 60 in the axial direction or is disposed on a slight axial downstream side with respect to the position of the axial downstream end 60aa. In a case where the heat-resistant coating film portion 52 is formed on the entire surface of an outer peripheral surface 48a of the protrusion portion 48, there is a case where the outer peripheral surface 48a of the protrusion portion 48 and an inner peripheral surface 60ba of the first main body portion 60a of the seal member 60 come into contact with each other due to mechanical vibrations that are generated during the operation of the gas turbine 1, and there is a possibility that the heat-resistant coating film portion 52 will be damaged due to the contact. Therefore, in order to avoid damage to the heat-resistant coating film portion 52, it is desirable that the position of the coating film portion upstream end 52a of the heat-resistant coating film portion 52 that is formed on the gas path surface 44a of the shroud 44 is at least the same position as the position of the axial downstream end 60aa of the first main body portion 60a of the seal member 60 or is on the axial downstream side with respect to the position of the axial downstream end 60aa of the first main body portion 60a. That is, it is desirable that when viewed in the blade height direction, the heat-resistant coating film portion 52 is not formed in a range on the upstream side of the coating film portion upstream end 52a of the heat-resistant coating film portion 52, which is a range overlapping with the seal member 60, within the outer peripheral surface 48a of the protrusion portion 48. The position of the axial downstream end 60aa of the first main body portion 60a of the seal member 60 is at a position on the most axial downstream side in the seal members 60, so that unless otherwise specified, the position of the axial downstream end 60aa of the first main body portion 60a of the seal member 60 may be read as the position of the axial downstream end of the seal member 60.

<<Fixed Seal>>

As shown in FIG. 4, a plate-shaped fixed seal 64 extending in the circumferential direction along an outer peripheral surface 60ca on an outer side in the blade height direction of the third main body portion 60c of the seal member 60 (the inner seal member 61) is disposed on the outer peripheral surface 60ca. The fixed seal 64 is joined to the outer peripheral surface 60ca of the third main body portion 60c by welding or the like. An outer peripheral surface 64a on the outer side in the blade height direction of the fixed seal 64 joined to the third main body portion 60c faces the recessed portion 63, and is in contact with an inner peripheral surface 48c on an inner side in the blade height direction of the protrusion portion 48 of the turbine static blade 40. During the operation of the gas turbine 1, the outer peripheral surface 64a of the fixed seal 64 and the inner peripheral surface 48c of the protrusion portion 48 are in constant contact with each other, and a seal surface is formed between the outer peripheral surface 64a of the fixed seal 64 and the inner peripheral surface 48c of the protrusion portion 48. The seal surface is formed, whereby the high-pressure compressed air A accumulated in the space 21 within the casing 20 is prevented from flowing out into the combustion gas flow path 37 through the gap between the protrusion portion 48 and the seal member 60.

As described above, in the fitting structure 70 composed of the protrusion portion 48 of the turbine static blade 40 and the first main body portion 60a and the third main body portion 60c of the seal member 60, it is desirable that a gap portion 71 that is formed to be sandwiched between the outer peripheral surface 48a of the protrusion portion 48 and the inner peripheral surface 60ba of the first main body portion 60a in the blade height direction has a gap interval (a gap amount CB) in the blade height direction made as small as possible in order to prevent the combustion gas G from the combustion gas flow path 37 from being drawn in the gap portion 71. However, since the inner peripheral surface 48c of the protrusion portion 48 and the outer peripheral surface 60ca of the third main body portion 60c are in contact with each other through the fixed seal 64, a gap in the blade height direction is not formed between the protrusion portion 48 of the turbine static blade 40 and the third main body portion 60c. A range in which the gap portion 71 is formed is a range in which the first main body portion 60a of the seal member 60 and the protrusion portion 48 overlap in the axial direction in a case of being viewed in the blade height direction, and is a range from a position of an upstream end 48b of the protrusion portion 48 to a gap portion inlet 71a of the gap portion 71. A position of the gap portion inlet 71a of the gap portion 71 corresponds to the position of the downstream end 60aa of the first main body portion 60a in the axial direction. A range in which the gap portion 71 overlaps in the circumferential direction may be a range between both ends in the circumferential direction of the protrusion portion 48, which are both ends in the circumferential direction of the turbine static blade 40. Further, the range may be a range between the flanges 35 at both ends in the circumferential direction of the axial downstream end of the transition piece 34. In the following description, several embodiments of the cooling passage 49 that is disposed in the protrusion portion 48 will be described.

First Embodiment

The cooling passage 49 according to the first embodiment will be described using FIGS. 4 and 5. The protrusion portion 48 of the turbine static blade 40 has the cooling passage 49 that penetrates the protrusion portion 48 in the blade height direction and that connects an outlet opening 49a formed on the outer peripheral surface 48a on the outer side in the blade height direction of the protrusion portion 48 and an inlet opening 49b formed on the inner peripheral surface 48c on the inner side in the blade height direction of the protrusion portion 48. A plurality of cooling passages 49 are arranged at predetermined intervals in the circumferential direction of the protrusion portion 48. It is desirable that the outlet opening 49a of the cooling passage 49 formed on the outer peripheral surface 48a of the protrusion portion 48 is formed at the gap portion 71 in the range from the position of the upstream end 48b of the outer peripheral surface 48a of the protrusion portion 48 to the coating film portion upstream end 52a, on the axial upstream side with respect to the position of the coating film portion upstream end 52a, which is an end portion on the axial upstream side of the heat-resistant coating film portion 52 formed on the gas path surface 44a of the shroud 44. Further, it is more desirable that the outlet opening 49a is disposed at a position closer to the coating film portion upstream end 52a rather than at a position closer to the axial upstream end of the outer peripheral surface 48a of the protrusion portion 48.

<<Inlet Opening>>

It is desirable that the inlet opening 49b of the cooling passage 49 is formed on the inner peripheral surface 48c of the protrusion portion 48 at a position close to the side end portion 47a on the leading edge 43a side of the shroud 44. A predetermined gap is formed in the axial direction between the turbine static blade 40 and the seal member 60 in order to absorb a difference in thermal elongation in the axial direction between the turbine static blade 40 and the seal member 60. In order to suppress the compressed air A in the space 21 of the casing 20 from flowing out into the combustion gas flow path 37 due to the difference in thermal elongation between the turbine static blade 40 and the seal member 60, a seal surface is formed between the outer peripheral surface 64a of the fixed seal 64 fixed to the third main body portion 60c and the inner peripheral surface 48c of the protrusion portion 48. A relative position in the axial direction between the protrusion portion 48 of the turbine static blade 40 and the seal member 60 changes while maintaining the seal surface. Therefore, even if the third main body portion 60c of the seal member 60 approaches the side end portion 47a of the shroud 44 of the turbine static blade 40 due to the difference in thermal elongation between the protrusion portion 48 of the turbine static blade 40 and the seal member 60, in order to prevent the inlet opening 49b of the cooling passage 49 from being blocked by the fixed seal 64, it is desirable that a position of the inlet opening 49b is disposed at the position close to the side end portion 47a. In order to provide the inlet opening 49b of the cooling passage 49 at the position close to the side end portion 47a on the leading edge 43a side of the turbine static blade 40 on the axial downstream side, it is desirable that the cooling passage 49 is formed as an inclined passage inclined toward the axial upstream side toward a downstream side in a flow direction of the cooling air. In a case where the protrusion portion 48 is viewed in the blade height direction, it is desirable that the position of the inlet opening 49b of the cooling passage 49 is disposed at a position closer to the side end portion 47a on the leading edge 43a side of the turbine static blade 40 than a position of the outlet opening 49a, and is disposed at the position closer to the side end portion 47a on the leading edge 43a side than to the axial downstream end of the fixed seal 64.

<<Disposition in Circumferential Direction of Cooling Passage>>

As shown in FIG. 5, the plurality of cooling passages 49 disposed in the protrusion portion 48 are arranged at predetermined intervals in the circumferential direction over the range of a full width L1 in the circumferential direction between the positive pressure surface-side end portion 47g and the negative pressure surface-side end portion 47h of the protrusion portion 48. In a case where the cooling passage 49 is viewed from the outside in the blade height direction, the outlet opening 49a formed on the outer peripheral surface 48a of the protrusion portion 48 is disposed on the axial upstream side compared to the inlet opening 49b formed on the inner peripheral surface 48c of the protrusion portion 48.

Further, the direction in which the cooling passage 49 extends in a leading edge-trailing edge direction is desirably set to form an inclined passage having a predetermined inclination in the circumferential direction with respect to the axial direction, and is more desirably set to form an inclined passage inclined toward a negative pressure surface-side end portion 47h side with respect to the direction in which the positive pressure surface-side end portion 47g extends. By making the cooling passage 49 an inclined passage, the cooling area increases, cooling of the protrusion portion 48 is enhanced, and the cooling air amount that is discharged from the cooling passage 49 can be reduced.

<<Modification Example of Cooling Passage>>

Figure 6:
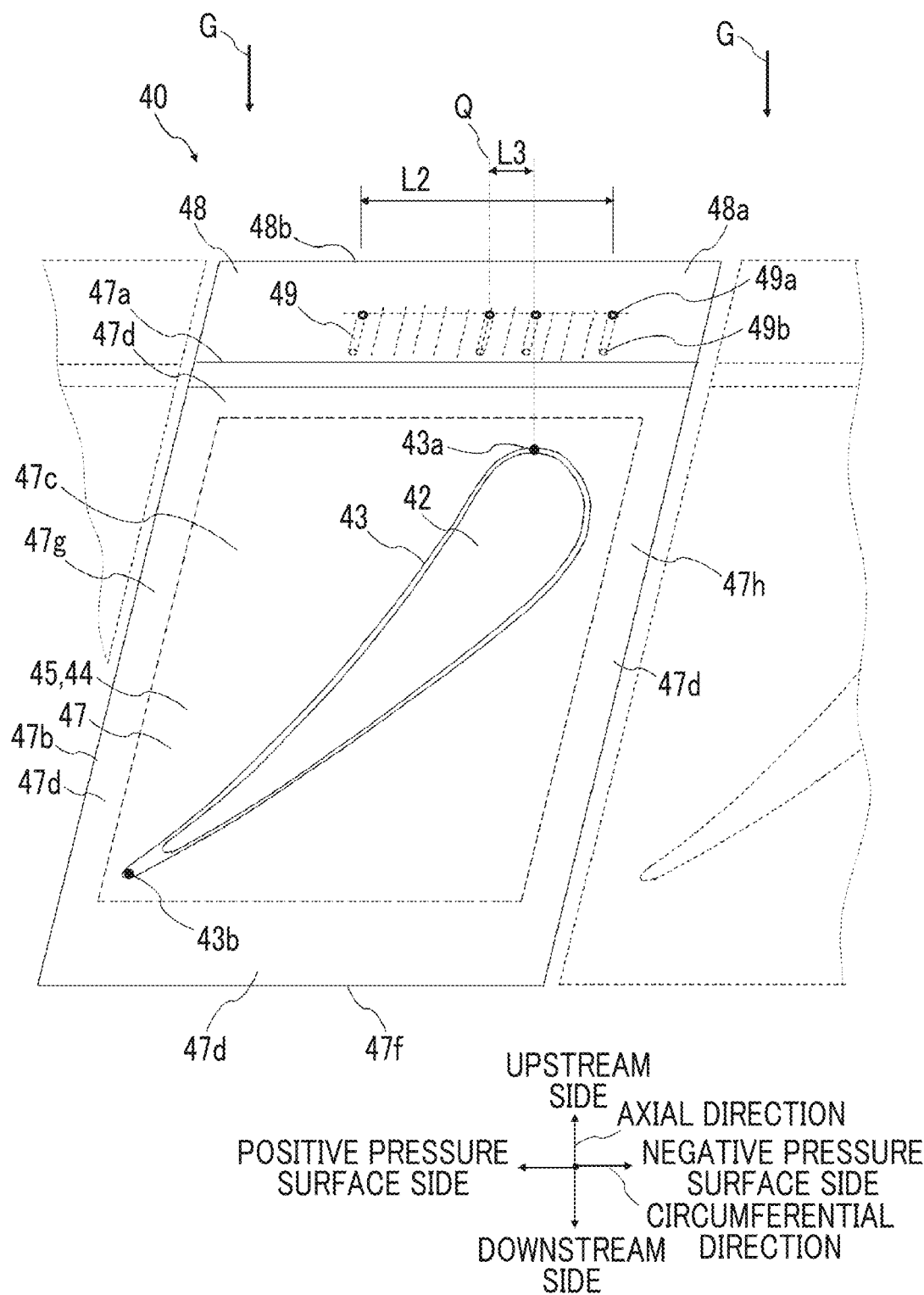
FIG. 6 is a modification example of the cooling air passage of the first embodiment according to the present disclosure.

FIG. 6 shows a modification example of the cooling passage 49 disposed in the protrusion portion 48. The disposition in the circumferential direction of the plurality of cooling passages 49 shown as a modification example is an example in which the cooling passages 49 are not arranged in the range of the full width L1 in the circumferential direction from the positive pressure surface-side end portion 47g to the negative pressure surface-side end portion 47h of the protrusion portion 48 (FIG. 5), but are arranged in the range of a partial width L2 in the circumferential direction, and a position of a midpoint Q of the arranged width L2 is arranged at a position closer to a positive pressure surface-side end portion 47g side by a length L3 in the circumferential direction from a position of the leading edge 43a of a blade surface 43. In the gas path surface 44a of the shroud 44 of the turbine static blade 40, the gas path surface 44a on the positive pressure surface-side end portion 47g side is more likely to be overheated than the gas path surface 44a on the negative pressure surface-side end portion 47h side by the combustion gas G flowing down from the leading edge 43a side toward a trailing edge 43b side along the blade surface 43. This tendency is the same in the protrusion portion 48 as well, and it is effective that the range in which the cooling passages 49 disposed in the protrusion portion 48 are disposed is set such that cooling is more enhanced on the positive pressure surface-side end portion 47g side than on the negative pressure surface-side end portion 47h side with the position of the leading edge 43a as a reference. The range in which the cooling passages 49 are disposed in the circumferential direction is disposed in a partial range closer to the positive pressure surface-side end portion 47g than to the leading edge 43a, so that the protrusion portion 48 is effectively cooled. Further, the cooling air amount is further reduced compared to the disposition of the cooling passages 49 shown in FIG. 5.

<<Effect of Cooling Passage>>

Here, the operation and effect in a case where the cooling passage 49 is provided in the protrusion portion 48 will be described.

As described above, in FIG. 4, the compressed air A accumulated in the space 21 of the casing 20 is supplied to the cooling passage 49 as cooling air. The cooling air is supplied to the cooling passage 49 from the inlet opening 49b of the protrusion portion 48 to convectively cool the protrusion portion 48. The cooling air after convectively cooling the protrusion portion 48 is discharged from the outlet opening 49a of the cooling passage 49 into the gap portion 71 of the fitting structure 70 formed between the protrusion portion 48 and the seal member 60. The cooling air discharged into the gap portion 71 collides with the inner peripheral surface 60ba of the first main body portion 60a of the seal member 60, which is disposed to face the outer peripheral surface 48a of the protrusion portion 48 in the blade height direction, and collisionally cools the inner peripheral surface 60ba of the first main body portion 60a. The cooling air after collisionally cooling the inner peripheral surface 60ba of the first main body portion 60a flows in the gap portion 71 toward the axial downstream side, and is discharged to the combustion gas flow path 37 from the gap portion inlet 71a of the gap portion 71 formed between the downstream end 60aa of the first main body portion 60a, which is the axial downstream end of the seal member 60, and the outer peripheral surface 48a of the protrusion portion 48. However, the operation and effect of the cooling air is different depending on whether the position of the outlet opening 49a through which the cooling air is discharged from the cooling passage 49 is set to discharge the cooling air into the gap portion 71 on the axial upstream side with respect to the gap portion inlet 71a, or to discharge the cooling air to the combustion gas flow path 37 on the downstream side with respect to the position of the axial downstream end 60aa of the seal member 60, which is the axial downstream side with respect to the gap portion inlet 71a. In the following, description will be made to include the difference.

Figure 7:
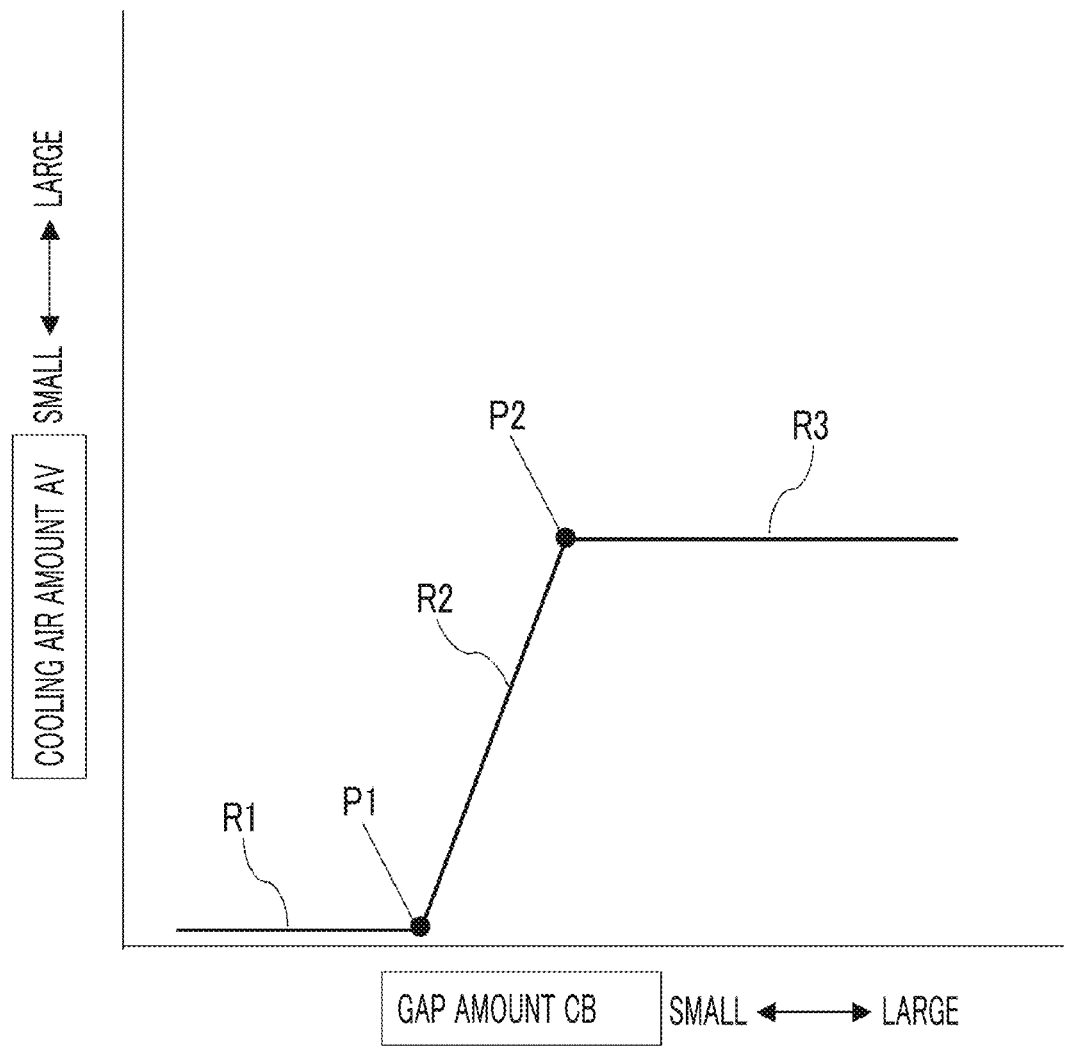
FIG. 7 is a diagram showing a relationship between a gap amount and a cooling air amount.

FIG. 7 shows a relationship between the gap amount CB of the gap portion 71 when the cooling air is discharged from the cooling passage 49 to the gap portion 71 and a cooling air amount AV that is discharged from the cooling passage 49, and in the drawing, a horizontal axis represents the gap amount CB, and a vertical axis represents the cooling air amount AV. The gap amount CB means an interval in the blade height direction between the outer peripheral surface 48a of the protrusion portion 48 and the inner peripheral surface 60ba of the first main body portion 60a of the seal member 60, which is disposed to face the outer peripheral surface 48a in the blade height direction (the radial direction), in the gap portion 71. In FIG. 7, in a first region R1 in which the gap amount CB is smaller than that at a point P1, the gap amount CB is small, and therefore, most of the pressure loss that occurs while the cooling air in the space 21 of the casing 20 is discharged to the combustion gas flow path 37 is a discharge side pressure loss of the cooling air in a section from the outlet opening 49a of the cooling passage 49 to the gap portion inlet 71a, and approximately corresponds to the differential pressure between the combustion gas flow path 37 and the space 21 of the casing 20. Here, the discharge side pressure loss of the cooling air refers to a pressure loss of the cooling air in the gap portion 71, which is generated while the cooling air discharged from the outlet opening 49a of the cooling passage 49 collides with the inner peripheral surface 60ba of the first main body portion 60a to change the flow direction toward the axial downstream side, flows down toward the axial downstream side in the gap portion 71, and is discharged from the gap portion inlet 71a to the combustion gas flow path 37. Therefore, an in-tube pressure loss in the cooling passage 49 of the cooling air between the space 21 of the casing 20 and the outlet opening 49a of the cooling passage 49 is small, and the cooling air amount AV flowing through the cooling passage 49 is limited to an extremely small amount. That is, the cooling air amount AV in the first region R1 is limited by the point P1 in the gap portion 71 or by the gap amount CB smaller than that at the point P1, and the cooling air amount AV that is discharged from the cooling passage 49 cannot be increased unless the gap amount CB is expanded to the gap amount CB exceeding the point P1. On the contrary, as long as at least the gap amount CB at the point P1 or the gap amount CB smaller than that at the point P1 is maintained, almost no cooling air in the space 21 of the casing 20 flows out toward a combustion gas flow path 37 side. In other words, the first region R1 is a gap rate-limiting region in which the cooling air amount AV is limited by the gap amount CB of the gap portion 71.

On the other hand, in a second region R2 in which the gap amount CB increases beyond the point P1, the cooling air amount AV increases as the gap amount CB increases. In the second region R2, since the discharge side pressure loss in the gap portion 71 relatively decreases as the gap amount CB increases, the differential pressure between the inlet opening 49b and the outlet opening 49a of the cooling passage 49 increases according to a decrease in the discharge side pressure loss, and the cooling air amount AV flowing through the cooling passage 49 increases linearly. However, in the second region R2, an increase in the cooling air amount AV according to an increase in the gap amount CB occurs up to the gap amount CB at a position of a point P2.

Next, in a third region R3 in which the gap amount CB further increases from the point P2, the gap amount increases more than in other regions, the discharge side pressure loss decreases, and the in-tube pressure loss in the cooling passage 49 increases. Therefore, the third region R3 is a region in which the cooling air amount AV does not increase even if the gap amount CB increases, and the cooling air that is discharged from the cooling passage 49 maintains substantially the same cooling air amount AV. Most of the pressure loss of the cooling air in the third region R3 is an in-tube pressure loss between the inlet opening 49b and the outlet opening 49a of the cooling passage 49, and exceeds the discharge side pressure loss in the gap portion 71. That is, the third region R3 is a cooling passage rate-limiting region in which the cooling air amount AV is limited by an opening area of the cooling passage 49. In the second region R2, the discharge side pressure loss in the gap portion 71 decreases as the gap amount CB of the gap portion 71 increases, and the differential pressure between the inlet opening 49b and the outlet opening 49a of the cooling air passage increases by an amount corresponding to a decrease in discharge side pressure loss, making it possible to increase the cooling air amount AV flowing through the cooling passage 49. However, the effect of increasing the cooling air amount AV due to a decrease in the discharge side pressure loss in the gap portion 71 is up to the gap amount CB at the position of the point P2. In the third region R3, unlike in the second region R2, the effect of reducing the discharge side pressure loss in the gap portion 71 due to an increase in the gap amount CB is small. The third region R3 is a region in which unless the in-tube pressure loss in the cooling passage 49 is reduced by increasing the opening area of the cooling passage 49 by an increase in the hole diameter, the number of holes, or the like of the cooling passage 49, an increase in the cooling air amount AV due to an increase in the gap amount CB cannot be expected.

In the first region R1 in which the gap amount CB is equal to or smaller than that at the point P1, the cooling air amount AV that is discharged from the cooling passage 49 is limited only by a predetermined gap amount CB regardless of the opening area of the cooling passage 49, and only a certain amount of a small amount of cooling air is discharged into the combustion gas flow path 37. On the other hand, in the third region R3, the cooling air amount AV that is discharged from the cooling passage 49 is limited by the specifications (the hole diameter, the number of holes, the opening area, or the like) of the cooling passage 49. In the third region R3, unless the opening area or the like of the cooling passage 49 is changed, only a certain amount of the cooling air amount AV is discharged, regardless of the magnitude of the gap amount CB of the gap portion 71. From another point of view, in the third region R3, by selecting the cooling passage 49 having appropriate specifications, excessive discharge of the cooling air is suppressed and the cooling air amount is reduced. The second region R2 sandwiched between the first region R1 and the third region R3 is an intermediate region transitioning from the first region R1 to the third region R3, and is a region in which the cooling air amount AV that is discharged increases as the gap amount CB increases.

<<Atmosphere Gas Temperature>>

Figure 8:
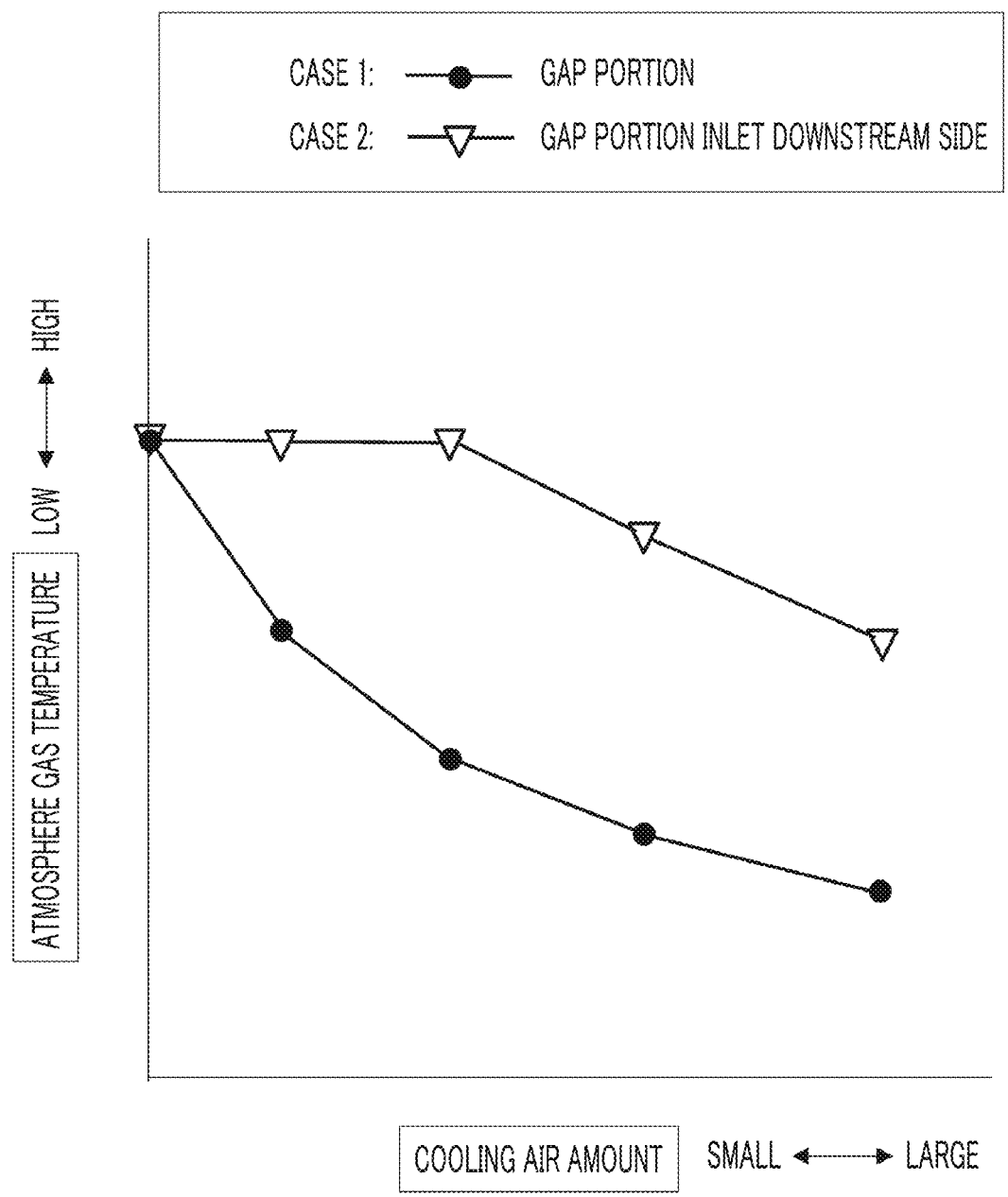
FIG. 8 is a diagram showing a relationship between the cooling air amount and a combustion gas temperature of a fitting portion.

FIG. 8 is a diagram showing a relationship between the cooling air amount in the gap portion 71 and an atmosphere gas temperature relating to the position of the outlet opening 49a of the cooling air discharged from the cooling passage 49. Case 1 is a case where the outlet opening 49a of the cooling passage 49 is disposed at a position close to the gap portion inlet 71a in the gap portion 71 on the outer peripheral surface 48a of the protrusion portion 48. Case 2 is a case where the position of the outlet opening 49a of the cooling passage 49 is provided at a position facing the combustion gas flow path 37 on the axial downstream side with respect to the position of the gap portion inlet 71a, that is, at a position close to the combustion gas flow path 37 on the outer side in the blade height direction of an outlet opening 60ea of the cooling flow path 60e of the seal member 60.

As shown in FIG. 4, the combustion gas G drawn into the gap portion 71 from the gap portion inlet 71a is a part of the combustion gas G flowing through the combustion gas flow path 37, and is the combustion gas G that remains in the region sandwiched between the downstream end 60aa of the first main body portion 60a of the seal member 60 (the inner seal member 61) and the gas path surface 44a on the leading edge 43a side of the turbine static blade 40. This region is a region on the axial downstream side of the axial downstream end 60aa of the first main body portion 60a, in which the outlet opening 60ea of the cooling flow path 60e disposed in the seal member 60 is disposed. Therefore, the atmosphere gas temperature in this region is reduced by the cooling air that is discharged from the outlet opening 60ea of the seal member 60, and is lower than the temperature of the combustion gas G flowing through the combustion gas flow path 37.

In the case of Case 1, the atmosphere gas temperature in the gap portion 71 decreases as the cooling air amount AV that is discharged from the cooling passage 49 increases. As described above, the combustion gas G drawn into the gap portion 71 from the gap portion inlet 71a is diluted by the cooling air that is discharged from the cooling flow path 60e, and has a temperature lower than the temperature of the combustion gas G flowing through the combustion gas flow path 37. Further, after the temperature is lowered, the combustion gas G drawn into the gap portion 71 which is a narrow space is further diluted by the cooling air from the cooling passage 49 discharged into the gap portion 71, and the atmosphere gas temperature in the gap portion 71 from the upstream end 48b in the axial direction of the protrusion portion 48 to the gap portion inlet 71a further decreases.

As a result, thermal damage to the outer peripheral surface 48a of the protrusion portion 48 and to the inner peripheral surface of the seal member 60 (the inner peripheral surface 60ba of the first main body portion 60a) that faces the outer peripheral surface 48a in the blade height direction is suppressed. That is, in the protrusion portion 48, thermal damage to the protrusion portion 48 is suppressed by the effect of convection cooling by the cooling air flowing through the cooling passage 49 and the effect of suppressing heat input from an atmosphere gas to the protrusion portion 48 by the effect of diluting the atmosphere gas in the gap portion 71 via the cooling air that is discharged from the cooling passage 49. Similarly, also with respect to the inner peripheral surface 60ba of the first main body portion 60a of the seal member 60, which faces the outer peripheral surface 48a of the protrusion portion 48 in the blade height direction, thermal damage to the seal member 60 is avoided by the effect of collision cooling of the cooling air that is discharged from the outlet opening 49a, and the effect of suppressing heat input from the atmosphere gas to the inner peripheral surface 60ba of the first main body portion 60a by the effect of diluting the atmosphere gas in the gap portion 71 via the cooling air.

In particular, in a case where the outlet opening 49a of the cooling passage 49 is disposed at the position close to the gap portion inlet 71a that is the axial downstream end of the seal member 60 in the gap portion 71, instead of at a position close to the upstream end 48b on the axial upstream side of the protrusion portion 48, the atmosphere gas temperature significantly decreases with respect to the cooling air amount AV. That is, in a case where the outlet opening 49a of the cooling passage 49 is disposed in the gap portion 71 close to the gap portion inlet 71a, the combustion gas G can be diluted quickly at a stage before the high-temperature combustion gas G drawn into the gap portion 71 from the combustion gas flow path 37 diffuses into the gap portion 71. Therefore, the atmosphere gas temperature in the gap portion 71 can be lowered in a short time with a small amount of cooling air, the dilution effect by the cooling air is large, excessive consumption of the cooling air amount is suppressed, and the cooling air amount is reduced. Further, since the atmosphere gas temperature in the gap portion 71 is quickly reduced, thermal damage to the protrusion portion 48 and the seal member 60 can be avoided.

On the other hand, the case of Case 2 is a case where an example thereof is shown in PTL 1 and the position of the outlet opening 49a of the cooling passage 49 is provided on the side close to the combustion gas flow path 37 on the outer side in the blade height direction with respect to a position of the outlet opening 60ea of the cooling flow path 60e of the seal member 60. In the case of Case 2, the combustion gas G that remains in the region sandwiched between the downstream end 60aa of the first main body portion 60a of the seal member 60 near the gap portion inlet 71a and the gas path surface 44a on the leading edge 43a side of the turbine static blade 40 is diluted by the cooling air that is discharged from the outlet opening 49a of the cooling passage 49, before the combustion gas G reaches this region, and is further diluted by the cooling air discharged from the outlet opening 60ea of the cooling flow path 60e of the seal member 60, so that the combustion gas G is diluted by the cooling air in two stages. However, in the case of Case 2, the region on the downstream side with respect to the gap portion inlet 71a where the combustion gas G remains is a wider space compared to the space in the gap portion 71, and even if the temperature is once lowered by dilution by the cooling air, the dilution effect by the cooling air is limited due to the circulation or the like of the combustion gas G surrounding this region in the circumferential direction. The combustion gas G in such a state is drawn into the gap portion 71 from the gap portion inlet 71a. Therefore, while the cooling air amount AV that is discharged from the cooling passage 49 is small, the atmosphere gas temperature in the gap portion 71 hardly decreases, and the dilution effect by the cooling air is not noticed. As shown in FIG. 8, a decrease in the atmosphere gas temperature in the gap portion 71 is recognized in a case where a predetermined amount or more of cooling air is supplied.

However, although the dilution effect of the cooling air is smaller than in Case 1, in a case where the position of the outlet opening 49a of the cooling passage 49 is disposed on the outer peripheral surface 48a of the protrusion portion 48 on the axial downstream side near the gap portion inlet 71a with respect to the structure of Case 1, the dilution effect of the cooling air is higher than in Case 2. That is, in the case of this case, the outlet opening 49a of the cooling passage 49 is disposed on the inner side in the blade height direction with respect to the position of the outlet opening 60ea of the cooling flow path 60e of the seal member 60. In this case, the combustion gas G that is diluted by the cooling air that is discharged from the cooling passage 49 is the combustion gas G after having been diluted by the cooling air that is discharged from the cooling flow path 60e of the seal member 60, and is diluted at a location close to the gap portion inlet 71a. In this region, the circulation of the surrounding combustion gas G is less, and the temperature of the combustion gas G that is drawn in from the gap portion inlet 71a is suppressed to be lower than in Case 2. Therefore, the dilution effect of the cooling air is larger than in Case 2, and the atmosphere gas temperature in the gap portion 71 is reduced with a smaller cooling air amount than in Case 2, and thermal damage to the protrusion portion 48 and the seal member 60 is suppressed.

As described above, in the case of the gas turbine 1 after long-term operation, in the fitting structure 70 between the seal member 60 and the turbine static blade 40, the outer peripheral surface 64a of the fixed seal 64 that seals the gap between the space 21 of the casing 20 and the combustion gas flow path 37 is worn out due to mechanical vibrations or the like due to long-term operation, and the gap amount CB of the gap portion 71 increases, so that there is a possibility that the combustion gas G that is drawn into the gap portion 71 increases. According to the fitting structure 70 shown in the present embodiment, as shown in FIG. 7, in a case where the gap amount CB of the gap portion 71 increases beyond the gap amount CB at the point P1 due to wear of the fixed seal 64, the cooling air amount AV that is discharged from the cooling passage 49 rapidly increases linearly along the line shown in the second region R2 as the gap amount CB increases. However, for example, even if the gap amount CB of the gap portion 71 increases and the combustion gas G flowing into the gap portion 71 from the gap portion inlet 71a increases, since the cooling air amount AV increases as the gap amount CB increases, the drawn-in combustion gas G is immediately diluted and the atmosphere gas temperature is lowered. As a result, thermal damage to the seal member 60 that forms the gap portion 71 and to the turbine static blade 40 is suppressed. In particular, when the position of the outlet opening 49a of the cooling passage 49 formed in the gap portion 71 is the position close to the gap portion inlet 71a, the effect of diluting the high-temperature combustion gas drawn into the gap portion 71 is exhibited with a smaller cooling air amount. However, as described above, an increase in the cooling air amount AV that is supplied from the cooling passage 49 according to an increase in the gap amount CB is up to the position of the point P2, and thereafter the cooling air amount AV in the third region R3 is restricted by the cooling passage 49 and is limited to a certain amount (cooling passage rate-limiting). Therefore, even if the combustion gas G is drawn into the gap portion 71 due to wear of the fixed seal 64, the cooling air amount required for dilution is immediately supplied, and discharge of an excessive amount of cooling air exceeding the required amount is suppressed.

According to the fitting structure 70 of the present embodiment, by appropriately selecting the specifications (the hole diameter, the number of holes, and the opening area) of the cooling passage 49 and the gap amount CB of the gap portion 71, even if the combustion gas G is drawn into the gap portion 71 of the fitting structure 70, the protrusion portion 48 of the turbine static blade 40 and the seal member 60 are properly cooled and thermal damage thereto is avoided. Further, since the gap amount CB of the gap portion 71 is kept small and an appropriate combination of the gap amount CB and the cooling passage 49 is selected, an excessive loss of the cooling air amount is suppressed, the cooling air amount is reduced, the efficiency of the gas turbine is improved, and the reliability of the gas turbine 1 is also improved.

Second Embodiment

Figure 9:
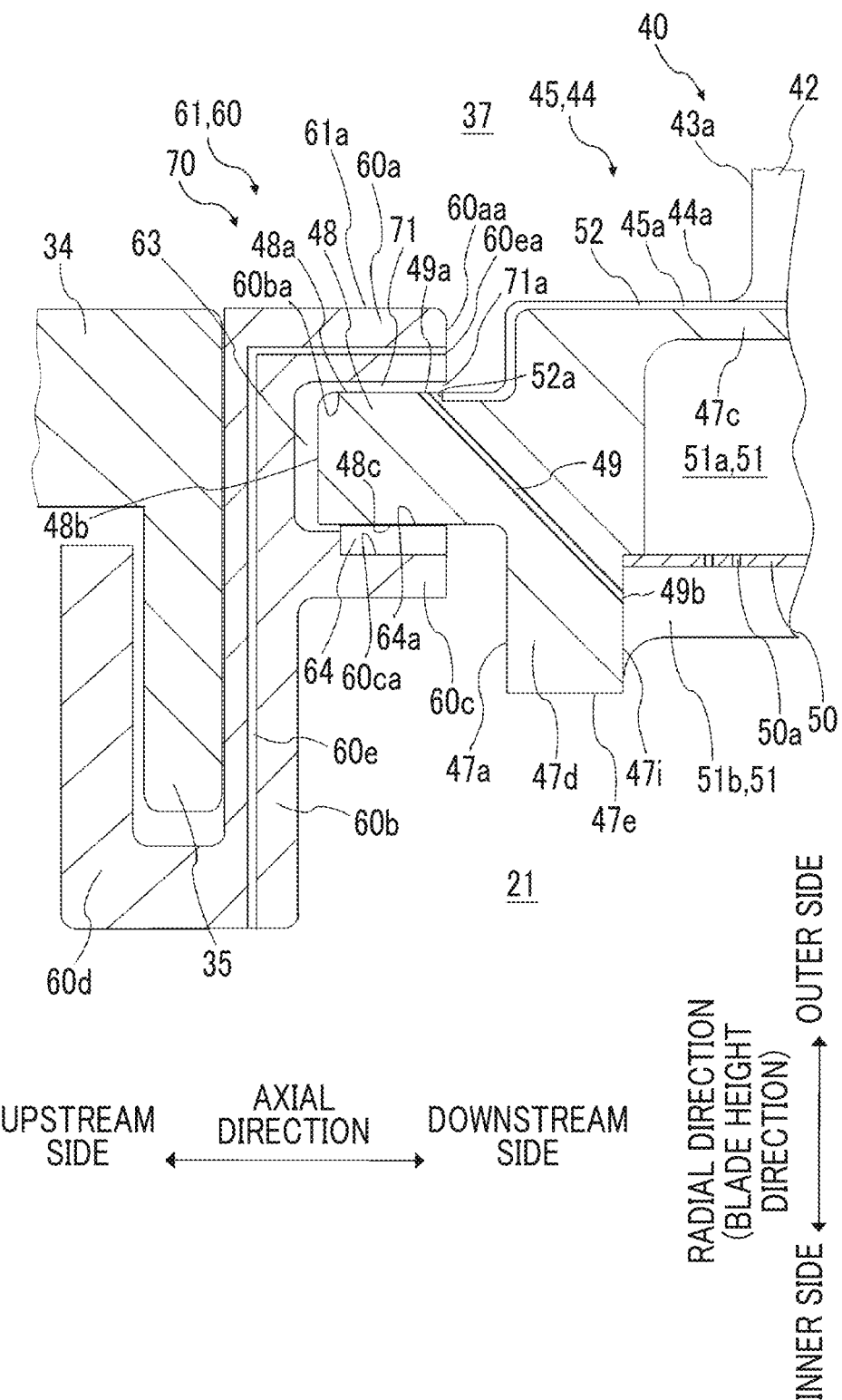
FIG. 9 is a structural diagram of the combination of the turbine static blade and the seal member in a second embodiment according to the present disclosure.

FIG. 9 shows a structure of a second embodiment in which the turbine static blade 40 and the seal member 60 are combined. The combined structure of the turbine static blade 40 and the seal member 60 shown in the present embodiment is the same as that in the first embodiment except that the position of the inlet opening 49b of the cooling passage 49 is different.

As shown in FIG. 9, this embodiment is the same as the first embodiment in that the outlet opening 49a of the cooling passage 49 formed in the protrusion portion 48 is formed on the outer peripheral surface 48a of the protrusion portion 48. However, this embodiment is different from the first embodiment in that the position of the inlet opening 49b is formed on an inner surface 47i of the outer wall portion 47d, which is the inner surface of the main member 47 of the shroud 44, instead of on the inner peripheral surface 48c of the protrusion portion 48.

As shown in FIG. 9, the cooling passage 49 in the present embodiment penetrates the protrusion portion 48 of the turbine static blade 40 and the outer wall portion 47d of the shroud 44 in the axial direction, and the outlet opening 49a of the cooling passage 49 is connected to the gap portion 71. The inlet opening 49b of the cooling passage 49 is open to the outer cavity 51b disposed on the inner side in the blade height direction away from the gas path surface 44a with respect to the collision plate 50 disposed on the shroud 44. The disposition in the circumferential direction of the cooling passages 49 is the same as in the first embodiment, and may be arranged in the range of the full width L1 in the circumferential direction shown in FIG. 5, or may be arranged in the range of the partial width L2 in the circumferential direction, as shown in the modification example of FIG. 6.

According to the cooling passage 49 in the present embodiment, by disposing the cooling passages 49 in the range of the full width L1 in the circumferential direction, the protrusion portion 48 can be properly cooled even in a case where the combustion gas G is drawn into the gap portion 71. Further, as in the modification example of the cooling passage 49 of the first embodiment shown in FIG. 6, even in a case where the cooling passages 49 are disposed in the range of the partial width L2 in the circumferential direction, the protrusion portion 48 is properly cooled, and the cooling air amount is reduced. In the case of the shroud 44 of the present embodiment, the cooling air is directly supplied from the space 21 in the casing 20 to the outer cavity 51b of the shroud 44 and is then supplied to the cooling passage 49.

Further, the relationship between the gap amount CB of the gap portion 71 and the cooling air amount AV in the first embodiment shown in FIG. 7 is also applicable to the present embodiment. That is, in FIG. 7, in the first region R1 in which the gap amount CB is smaller than that at the point P1, the cooling air amount AV that is discharged is limited only by the gap amount CB regardless of the size of the hole diameter or the like of the cooling passage 49, and only a certain amount of a small amount of cooling air is discharged, and this region is a gap rate-limiting region. On the other hand, in the third region R3 in which the gap amount CB is larger than that at the point P2, the cooling air amount AV that is discharged is limited by the specifications such as the opening area of the cooling passage 49, and this region is a cooling passage rate-limiting region in which a certain amount of cooling air is discharged regardless of the magnitude of the gap amount CB. The second region R2 sandwiched between the first region R1 and the third region R3 is an intermediate region transitioning from the first region R1 to the third region R3, and is a region in which the cooling air amount increases as the gap amount CB increases. Also in the present embodiment, by forming the outlet opening 49a of the cooling passage 49 in the gap portion 71 of the fitting structure 70 which is a combined structure of the turbine static blade 40 and the seal member 60, the protrusion portion 48 of the turbine static blade 40 and the seal member 60 are properly cooled, an excessive loss of the cooling air amount is suppressed, and the cooling air amount is reduced.

Further, the relationship between the cooling air amount and the atmosphere gas temperature in the gap portion 71 with respect to a difference in the position of the outlet opening 49a of the cooling passage 49 shown in FIG. 8 can also be applied to the present embodiment.

Third Embodiment

Figure 10:
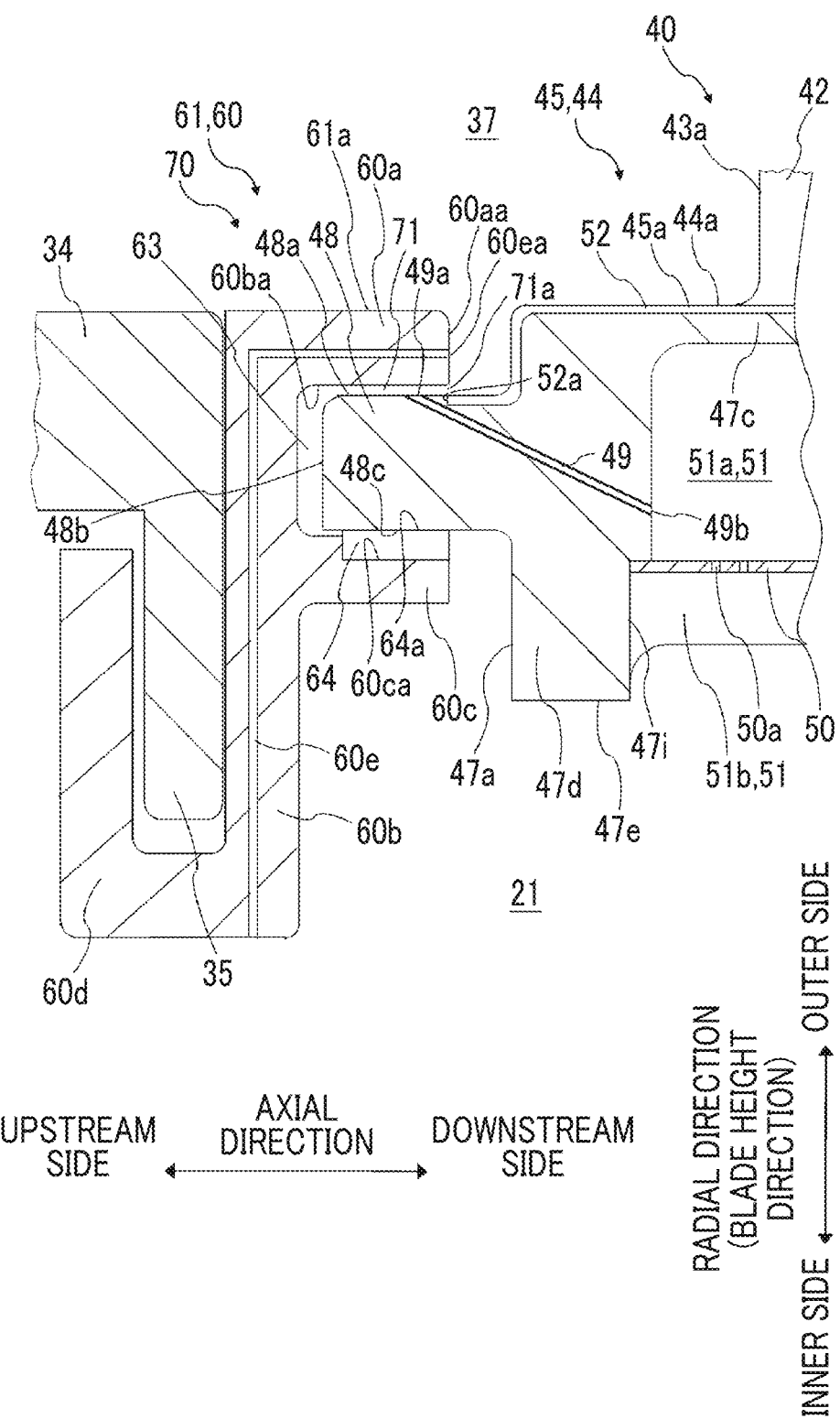
FIG. 10 is a structural diagram of the combination of the turbine static blade and the seal member in a third embodiment according to the present disclosure.

FIG. 10 shows a structure of a third embodiment in which the turbine static blade 40 and the seal member 60 are combined. The combined structure of the turbine static blade 40 and the seal member 60 shown in the present embodiment is the same structure as in the first embodiment and the second embodiment except that the position of the inlet opening 49b of the cooling passage 49 is different.

The inlet opening 49b of the cooling passage 49 of the present embodiment has the same structure as in the second embodiment in that the inlet opening 49b is formed in the outer wall portion 47d of the shroud 44. However, this embodiment is different from the second embodiment, in which the inlet opening 49b of the cooling passage 49 communicates with the outer cavity 51b, in that the position of the inlet opening 49b of the cooling passage 49 communicates with the inner cavity 51a disposed on the side close to the gas path surface 44a with respect to the collision plate 50 disposed at the shroud 44.

In the case of the present embodiment, since the position of the inlet opening 49b of the cooling passage 49 is different from that in the second embodiment, the operation and effect of the present embodiment are different from those of the second embodiment. That is, in the case of the shroud 44 of the present embodiment, the cooling air is directly supplied to the outer cavity 51b of the shroud 44 from the space 21 in the casing 20. The cooling air supplied to the outer cavity 51b is discharged into the inner cavity 51a through the plurality of through-holes 50a of the collision plate 50. The cooling air supplied to the inner cavity 51a becomes a jet flow and collides with the inner peripheral surface of the bottom portion 47c forming the gas path surface 44a, thereby collisionally cooling the inner peripheral surface. The cooling air after collisionally cooling the inner peripheral surface of the bottom portion 47c is supplied to the inlet opening 49b formed in the outer wall portion 47d on the leading edge 43a side.

Therefore, in the case of the cooling passage 49 in the present embodiment, since the cooling air supplied from the outside of the shroud 44 collisionally cools the bottom portion 47c of the shroud 44, and then convectively cools the protrusion portion 48 in the process of flowing through the cooling passage 49, the cooling air is reused and the cooling efficiency of the gas turbine 1 is increased, compared to the second embodiment. On the other hand, the cooling air in the outer cavity 51b is reduced in pressure due to a pressure loss in the process of flowing into the inner cavity 51a through the through-holes 50a of the collision plate 50 and colliding with the bottom portion 47c. Therefore, the pressure in the inner cavity 51a is lower than the pressure in the outer cavity 51b. That is, the cooling air that is supplied to the cooling passage 49 is supplied at higher pressure in the structure of the second embodiment than in the structure of the present embodiment, and the allowable range of a pressure loss is larger. Therefore, the cooling effect on the protrusion portion 48 is larger in the second embodiment.

Also in the present embodiment, the same disposition as the disposition in the circumferential direction of the cooling passages 49 of the first embodiment shown in FIG. 5 is applied. By disposing the cooling passages 49 in the range of the full width L1 in the circumferential direction, the protrusion portion 48 can be properly cooled even in a case where the combustion gas G is drawn into the gap portion 71. Further, as in the modification example of the cooling passage 49 of the first embodiment shown in FIG. 6, even in a case where the cooling passages 49 are disposed in the range of the partial width L2 in the circumferential direction, the protrusion portion 48 is properly cooled, and the cooling air amount is reduced.

Further, the relationship between the gap amount CB of the gap portion 71 and the cooling air amount AV in the first embodiment shown in FIG. 7 is also applicable to the present embodiment. In FIG. 7, the first region R1 in which the gap amount CB is smaller than that at the point P1 is a gap rate-limiting region in which the cooling air amount AV that is discharged is limited only by the gap amount CB regardless of the size of the hole diameter or the like of the cooling passage 49, and only a certain amount of a small amount of cooling air is discharged. The third region R3 in which the gap amount CB is larger than that at the point P2 is a cooling passage rate-limiting region in which the cooling air amount AV that is discharged is limited by the specifications such as the opening area of the cooling passage 49, and a certain amount of cooling air is discharged regardless of the magnitude of the gap amount CB. The second region R2 sandwiched between the first region R1 and the third region R3 is an intermediate region transitioning from the first region R1 to the third region R3, and is a region in which the cooling air amount AV that is discharged increases as the gap amount CB increases.

The dimensions, materials, shapes, relative disposition, and the like of the components described in each of the embodiments described above or shown in the drawings are not intended to limit the scope of the invention thereto, but are merely explanatory examples. For example, an expression indicating a relative disposition or an absolute disposition, such as "in a direction", "along a direction", "parallel", "orthogonal", "center", "concentric", or "coaxial", not only strictly represents such a disposition, but also represents a state of being relatively displaced with a tolerance, or an angle or a distance to the extent that the same function can be obtained. For example, expressions such as "identical", "equal", and "homogeneous", which indicate that things are in the same state, not only represent a state of being strictly equal, but also represent a state in which there is a tolerance, or a difference to the extent that the same function can be obtained.

For example, an expression indicating a shape such as a square shape or a cylindrical shape not only represents a shape such as a square shape or a cylindrical shape in a geometrically strict sense, but also represents a shape that includes concave and convex portions, chamfered portions, or the like to the extent that the same effects can be obtained. Meanwhile, an expression such as "comprising", "possessing", "provided with", "including", or "having" one component is not an exclusive expression excluding the presence of other components.

The contents described in each of the embodiments described above are understood as follows.

(1) A turbine static blade according to a first aspect includes a blade body, and shrouds formed at both ends in a blade height direction of the blade body, in which the shroud includes a main member having a heat-resistant coating film portion which extends from an axial upstream end to an axial downstream end of a gas path surface, and a protrusion portion which protrudes from a side end portion on a leading edge side of the main member toward an axial upstream side, and the protrusion portion includes a plurality of cooling passages which are annularly disposed at predetermined intervals in a circumferential direction, and each of which connects an inlet opening formed on an inner peripheral surface of the protrusion portion or on an inner surface of the main member, and an outlet opening formed on an outer peripheral surface of the protrusion portion.

According to the turbine static blade described in the above (1), when the combustion gas is drawn into the gap of the fitting portion between the turbine static blade and the seal member, the cooling of the protrusion portion is enhanced due to the cooling passage disposed in the protrusion portion, thermal damage to the protrusion portion is suppressed, and the reliability of the gas turbine is improved.

(2) In a turbine static blade according to a second aspect, in the turbine static blade of the above (1), the outlet opening of the cooling passage is formed on the axial upstream side with respect to a position of a coating film portion upstream end on an axial upstream side of the heat-resistant coating film portion formed on the main member.

According to the turbine static blade described in the above (2), cooling of the protrusion portion, which is exposed to a high-temperature combustion gas and in which it is difficult to form a heat-resistant coating film portion, is enhanced.

(3) In a turbine static blade according to a third aspect, in the turbine static blade of the above (2), the outlet opening of the cooling passage is disposed close to the position of the coating film portion upstream end, on an axial downstream side with respect to a position of an upstream end on an axial upstream side of the protrusion portion.

According to the turbine static blade described in the above (3), since the outlet opening of the cooling passage is disposed close to the position of the coating film portion upstream end, the combustion gas drawn into the gap portion can be diluted with a smaller amount of cooling air, so that the cooling air amount is reduced.

(4) In a turbine static blade according to a fourth aspect, in the turbine static blade of any one of the above (1) to (3), the inlet opening of the cooling passage formed on the inner peripheral surface of the protrusion portion is formed close to the side end portion on the leading edge side of the main member.

According to the turbine static blade described in the above (4), since the position of the inlet opening of the cooling passage can be disposed close to the side end portion on the leading edge side of the turbine static blade, the inlet opening can be prevented from being blocked.

(5) In a turbine static blade according to a fifth aspect, in the turbine static blade of any one of the above (1) to (3), the shroud includes a cavity formed by a bottom portion forming a bottom surface of the main member and an outer wall portion formed at an outer edge of the shroud and protruding in the blade height direction, and the inlet opening formed on the inner surface of the main member communicates with the cavity.

According to the turbine static blade described in the above (5), the position of the inlet opening of the cooling passage is provided in the outer wall portion of the shroud, so that blockage of the inlet opening can be avoided.

(6) In a turbine static blade according to a sixth aspect, in the turbine static blade of the above (5), the shroud includes a collision plate that divides the cavity into an inner cavity formed on a gas path surface side in the blade height direction, and an outer cavity disposed adjacent to the inner cavity in a direction opposite to the gas path surface in the blade height direction, and the inlet opening of the cooling passage is formed on an inner surface of the outer wall portion on a leading edge side of the inner cavity.

According to the turbine static blade described in the above (6), the inlet opening of the cooling passage is formed on the inner surface of the inner cavity of the shroud, and the cooling air supplied to the inner cavity collisionally cools the bottom portion of the shroud and is then supplied to the cooling passage to convectively cool the protrusion portion. Therefore, the cooling air is reused and cooling efficiency is improved.

(7) In a turbine static blade according to a seventh aspect, in the turbine static blade of any one of the above (1) to (6), the plurality of cooling passages are disposed in a range of a partial width instead of a full width in the circumferential direction from a negative pressure surface-side end portion to a positive pressure surface-side end portion of the shroud, and a center position in the circumferential direction of the range in which the plurality of cooling passages are disposed is closer to a positive pressure surface-side end portion side with respect to a position of a leading edge of the blade body.

According to the turbine static blade described in the above (7), since the range in which the cooling passages formed in the protrusion portion are disposed is set to be a partial range instead of the full width of the protrusion portion, so that cooling on the positive pressure surface-side end portion side is enhanced, the protrusion portion is properly cooled and the cooling air amount is reduced.

(8) In a turbine static blade according to an eighth aspect, in the turbine static blade of any one of the above (1) to (7), the cooling passage is inclined to the axial upstream side toward the outlet opening from the inlet opening.

According to the turbine static blade described in the above (8), since the cooling passage is a passage that is inclined to the axial upstream side toward the outlet opening, blockage of the inlet opening is avoided.

(9) In a turbine static blade according to a ninth aspect, in the turbine static blade of any one of the above (1) to (8), the cooling passage forms an inclined flow path that is close to a negative pressure surface-side end portion of the shroud with respect to the axial direction toward the outlet opening from the inlet opening.

According to the turbine static blade described in the above (9), by making the cooling passage an inclined flow path, the cooling area is expanded and the cooling air amount is reduced.

(10) In a turbine static blade according to a tenth aspect, in the turbine static blade of any one of the above (1) to (9), the shroud includes an outer shroud formed at an end portion on an outer side in the blade height direction of the blade body, and an inner shroud formed at an end portion on an inner side in the blade height direction of the blade body.

(11) A fitting structure according to an eleventh aspect includes a combustor, a turbine static blade that includes a blade body and a shroud, and a seal member that faces a combustion gas flow path and that is disposed between the turbine static blade and the combustor, in which the shroud includes a main member which extends from an axial upstream end to an axial downstream end, and a protrusion portion which protrudes from a side end portion on a leading edge side of the main member toward an axial upstream side, the protrusion portion includes a plurality of cooling passages which are disposed at predetermined intervals in a circumferential direction, and each of which connects an inlet opening formed on an inner peripheral surface of the protrusion portion or on an inner surface of the main member, and an outlet opening formed on an outer peripheral surface of the protrusion portion, and the outlet opening is open to a gap portion which is formed between an inner peripheral surface of the seal member and the outer peripheral surface of the protrusion portion and which extends in the circumferential direction, on an upstream side with respect to a position of an axial downstream end of the seal member.

According to the fitting structure described in the above (11), since the cooling passage is formed in the protrusion portion of the fitting structure composed of the combustor, the turbine static blade, and the seal member and the outlet opening of the cooling passage is open to the gap portion of the fitting structure, even if the gap amount of the gap portion increases and the combustion gas is drawn into the gap portion, the combustion gas is immediately diluted by a small amount of cooling air that is discharged from the cooling passage, and the atmosphere gas temperature in the gap portion decreases, so that thermal damage to the fitting structure is suppressed.

(12) In a fitting structure according to a twelfth aspect, in the fitting structure of the above (11), the seal member includes a first main body portion which is in contact with the combustion gas flow path and extends in an axial direction, a second main body portion which is connected to the first main body portion at the axial upstream end and extends in a blade height direction, and a third main body portion which extends in an axial downstream direction from an intermediate position of the second main body portion in the blade height direction, a plate-shaped fixed seal extending in the circumferential direction along an outer peripheral surface of the third main body portion is disposed on the outer peripheral surface, and a seal surface is formed between an outer peripheral surface of the fixed seal and the inner peripheral surface of the protrusion portion.

According to the fitting structure described in the above (12), since the plate-shaped fixed seal is disposed on the outer peripheral surface of the third main body portion and the seal surface is formed between the outer peripheral surface of the fixed seal and the inner peripheral surface of the protrusion portion, the cooling air can be prevented from flowing out into the combustion gas flow path from the gap between the seal member and the protrusion portion.

(13) In a fitting structure according to a thirteenth aspect, in the fitting structure of the above (11) or (12), the shroud includes an outer shroud formed at an end portion on an outer side in the blade height direction of the blade body, and an inner shroud formed at an end portion on an inner side in the blade height direction of the blade body.

(14) A gas turbine according to a fourteenth aspect includes the turbine static blade of any one of the above (1) to (10).

(15) A gas turbine according to a fifteenth aspect includes the fitting structure of any one of the above (11) to (13).

(16) A method for adjusting a cooling air amount of a fitting structure according to a sixteenth aspect is a method for adjusting a cooling air amount of the fitting structure which includes a turbine static blade that includes a blade body and a shroud, a combustor, and a seal member disposed between the turbine static blade and the combustor in an axial direction, in which the shroud includes a protrusion portion that protrudes from a side end portion on a leading edge side toward an axial upstream side, the seal member includes a first main body portion that extends in the axial direction and that has an outer peripheral surface which is in contact with the combustion gas flow path, the protrusion portion includes a plurality of cooling passages which are disposed at predetermined intervals in a circumferential direction, and each of which connects an inlet opening formed on an inner peripheral surface of the protrusion portion, and an outlet opening formed on an outer peripheral surface of the protrusion portion, and a gap portion is formed in a blade height direction between the outer peripheral surface of the protrusion portion and an inner peripheral surface of the seal member, the method including: reducing a cooling air amount that is discharged to a small amount, by being limited by a gap amount of the gap portion, in a first region in which the gap amount of the gap portion is small; increasing the cooling air amount that is discharged, according to an increase in the gap amount, in a second region in which the gap amount is larger than in the first region; and suppressing the cooling air amount that is discharged, by being limited by an opening area of the cooling passage, in a third region in which the gap amount is larger than in the second region.

According to the method for adjusting a cooling air amount of a fitting structure described in the above (16), in the method for adjusting the cooling air in the fitting structure composed of the turbine static blade, the combustor, and the seal member disposed between the turbine static blade and the combustor, while the gap amount of the gap portion is small, the cooling air amount is limited by the gap amount of the gap portion, and the cooling air amount that is discharged into the gap portion is reduced to a small amount, so that the fitting structure is properly cooled and thermal damage is suppressed. Therefore, the reliability of the gas turbine is improved. Further, the cooling air amount is reduced, and the cooling efficiency of the gas turbine is improved.

REFERENCE SIGNS LIST

1: gas turbine
2: compressor
4: combustor
6: turbine
8: rotor
10: compressor casing
12: intake chamber
14: inlet guide blade
16: compressor static blade
18: compressor rotor blade
20: casing
21: space 22: turbine casing
26: turbine rotor blade
28: exhaust casing
29: exhaust chamber
30: combustion-fuel nozzle
32: combustion cylinder
33: inner cylinder
34: transition piece
35: flange
37: combustion gas flow path
40: turbine static blade
42: blade body
43: blade surface
43a: leading edge
43b: trailing edge
44: shroud (inner shroud 45, outer shroud 46)
44a: gas path surface
47: main member
47a: side end portion
47b: outer edge
47c: bottom portion
47d: outer wall portion
47e: outer wall end portion
47f: downstream end portion
47g: positive pressure surface-side end portion
47h: negative pressure surface-side end portion
47i: inner surface
48: protrusion portion
48a: outer peripheral surface
48b: upstream end
48c: inner peripheral surface
49: cooling passage
49a: outlet opening
49b: inlet opening
50: collision plate
50a: through-hole
51: cavity (inner cavity 51a, outer cavity 51b)
52: heat-resistant coating film portion
52a: coating film portion upstream end
60: seal member (inner seal member 61, outer seal member 62)
60a: first main body portion
60aa: downstream end
60ba: inner peripheral surface
60b: second main body portion
60c: third main body portion
60ca: outer peripheral surface
60d: connecting portion
60e: cooling flow path
60ea: outlet opening
61a: radial outer surface
62a: radial inner surface
63: recessed portion
64: fixed seal
64a: outer peripheral surface
70: fitting structure
71: gap portion
71a: gap portion inlet
R1: first region
R2: second region
R3: third region
A: compressed air
CB: gap amount
AV: cooling air amount

The invention claimed is:

1. A turbine static blade comprising:
a blade body; and
shrouds respectively formed at opposite ends in a blade height direction of the blade body,
wherein one of the shrouds includes
a main member having a heat-resistant coating film portion which extends from an axial upstream end to an axial downstream end of a gas path surface, and
a protrusion portion which protrudes from a side end portion on a leading edge side of the main member toward an axial upstream side, the protrusion portion including an inner peripheral surface and an outer peripheral surface, the inner and outer peripheral surfaces both extending along an axial direction,
the protrusion portion is configured to be fittable into a recessed portion which is formed in a seal member arranged adjacent to the turbine static blade and is recessed toward an axially upstream direction, and
the protrusion portion includes a plurality of cooling passages which are annularly disposed at predetermined intervals in a circumferential direction, wherein each cooling passage connects a respective inlet opening formed on an inner peripheral surface of the protrusion portion or on an inner surface of the main member, and a respective outlet opening which is formed on an outer peripheral surface of the protrusion portion and which opens into a gap portion, the gap portion being formed between an inner peripheral surface of the seal member and the outer peripheral surface of the protrusion portion and extending in the circumferential direction on an upstream side with respect to a position of an axial downstream end of the seal member.

2. The turbine static blade according to claim 1,
wherein for each cooling passage, the outlet opening of the cooling passage is formed axially upstream of a position of a coating film portion upstream end, the coating film portion upstream end being at an axial upstream end of the heat-resistant coating film portion formed on the main member.

3. The turbine static blade according to claim 2,
wherein for each cooling passage, the outlet opening of the cooling passage is disposed axially downstream of an axial upstream end of the protrusion portion, and is disposed closer to the position of the coating film portion upstream end than to a position of the axial upstream end of the protrusion portion.

4. The turbine static blade according to claim 1,
wherein for each cooling passage, the inlet opening of the cooling passage formed on the inner peripheral surface of the protrusion portion is formed closer to the side end portion on the leading edge side of the main member than to the outlet opening of the cooling passage.

5. The turbine static blade according to claim 1,
wherein the one of the shrouds includes a cavity formed by a bottom portion forming a bottom surface of the main member and an outer wall portion formed at an outer edge of the one of the shrouds and protruding in the blade height direction, and
for each cooling passage, the inlet opening is formed on the inner surface of the main member and communicates with the cavity.

6. The turbine static blade according to claim 5,
wherein the one of the shrouds includes a collision plate that divides the cavity into an inner cavity formed on a gas path surface side in the blade height direction, and an outer cavity disposed adjacent to the inner cavity in a direction opposite to the gas path surface in the blade height direction, and for each cooling passage, the inlet opening of the cooling passage is formed on an inner surface of the outer wall portion on a leading edge side of the inner cavity.

7. A turbine static blade comprising:

a blade body; and shrouds respectively formed at opposite ends in a blade height direction of the blade body, wherein one of the shrouds includes a main member having a heat-resistant coating film portion which extends from an axial upstream end to an axial downstream end of a gas path surface, and a protrusion portion which protrudes from a side end portion on a leading edge side of the main member toward an axial upstream side, wherein the protrusion portion includes a plurality of cooling passages which are annularly disposed at predetermined intervals in a circumferential direction, wherein each cooling passage connects a respective inlet opening formed on an inner peripheral surface of the protrusion portion or on an inner surface of the main member, and a respective outlet opening formed on an outer peripheral surface of the protrusion portion, wherein the plurality of cooling passages are disposed in a range of a partial width instead of a full width in the circumferential direction from a negative pressure surface-side end portion to a positive pressure surface-side end portion of the one of the shrouds, and a center position in the circumferential direction of the range in which the plurality of cooling passages are disposed is closer to a positive pressure surface-side end portion side with respect to a position of a leading edge of the blade body.

8. The turbine static blade according to claim 1, wherein for each cooling passage, the cooling passage is inclined toward the axial upstream side and toward the outlet opening from the inlet opening.

9. The turbine static blade according to claim 1, wherein for each cooling passage, the cooling passage forms an inclined flow path that is inclined toward a negative pressure surface-side end portion of the one of the shrouds from the inlet opening to the outlet opening.

10. The turbine static blade according to claim 1, wherein the shrouds include an outer shroud formed at an end portion on an outer side in the blade height direction of the blade body, and an inner shroud formed at an end portion on an inner side in the blade height direction of the blade body, and the one of the shrouds is the inner shroud.

11. A fitting structure comprising:

a combustor;

a turbine static blade that includes a blade body and a shroud; and a seal member that faces a combustion gas flow path and that is disposed between the turbine static blade and the combustor, wherein the shroud includes a main member which extends from an axial upstream end to an axial downstream end, and a protrusion portion which protrudes from a side end portion on a leading edge side of the main member toward an axial upstream side, the protrusion portion includes a plurality of cooling passages which are disposed at predetermined intervals in a circumferential direction, and each of which connects an inlet opening formed on an inner peripheral surface of the protrusion portion or on an inner surface of the main member, and an outlet opening formed on an outer peripheral surface of the protrusion portion, the seal member has a recessed portion recessed toward an axial upstream side, and the protrusion portion of the turbine static blade can be fitted into the recessed portion, and the outlet opening opens into a gap portion which is formed between an inner peripheral surface of the seal member and the outer peripheral surface of the protrusion portion and which extends in the circumferential direction, on an upstream side with respect to a position of an axial downstream end of the seal member.

12. The fitting structure according to claim 11, wherein the seal member includes a first main body portion which is in contact with the combustion gas flow path and extends in an axial direction, a second main body portion which is connected to the first main body portion at the axial upstream end and extends in a blade height direction, and a third main body portion which extends in an axial downstream direction from an intermediate position of the second main body portion in the blade height direction, a plate-shaped fixed seal extending in the circumferential direction along an outer peripheral surface of the third main body portion is disposed on the outer peripheral surface, and a seal surface is formed between an outer peripheral surface of the fixed seal and the inner peripheral surface of the protrusion portion.

13. The fitting structure according to claim 11, wherein the shroud includes an outer shroud formed at an end portion on an outer side a blade height direction of the blade body, and an inner shroud formed at an end portion on an inner side in the blade height direction of the blade body.

14. A gas turbine comprising:

the turbine static blade according to claim 1.

15. A gas turbine comprising:

the fitting structure according to claim 11.

* * * * *